United States Patent
Linsky et al.

(10) Patent No.: US 7,164,734 B2
(45) Date of Patent: *Jan. 16, 2007

(54) DECISION DIRECTED PHASE LOCKED LOOPS (DD-PLL) WITH EXCESS PROCESSING POWER IN DIGITAL COMMUNICATION SYSTEMS

(75) Inventors: Stuart T. Linsky, Rancho Palos Verdes, CA (US); Scott A. Cooper, Seattle, WA (US); Christopher W. Walker, Stevens Ranch, CA (US); Ali R. Golshan, Hawthorne, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 769 days.

This patent is subject to a terminal disclaimer.

(21) Appl. No.: 10/005,049

(22) Filed: Dec. 4, 2001

(65) Prior Publication Data

US 2003/0112899 A1 Jun. 19, 2003

(51) Int. Cl.
*H04B 17/00* (2006.01)
*H04Q 1/20* (2006.01)
(52) U.S. Cl. ............ 375/327; 375/326; 375/328; 375/376
(58) Field of Classification Search ............ 375/327, 375/376, 261, 375, 233, 371, 281, 279, 291, 375/294, 326
See application file for complete search history.

(56) References Cited

U.S. PATENT DOCUMENTS

| | | | | |
|---|---|---|---|---|
| 5,151,919 A | * | 9/1992 | Dent | 370/209 |
| 5,170,415 A | * | 12/1992 | Yoshida et al. | 375/326 |
| 5,572,558 A | * | 11/1996 | Beherns | 375/376 |
| 5,968,198 A | * | 10/1999 | Hassan et al. | 714/752 |
| 5,983,385 A | * | 11/1999 | Khayrallah et al. | 714/755 |
| 6,236,687 B1 | * | 5/2001 | Caso et al. | 375/327 |
| 6,297,702 B1 | * | 10/2001 | Locker et al. | 331/2 |
| 6,396,804 B1 | * | 5/2002 | Odenwalder | 370/209 |
| 6,760,393 B1 | * | 7/2004 | Alisobhani et al. | 375/365 |
| 2001/0048329 A1 | * | 12/2001 | Sumi | 327/156 |
| 2003/0031275 A1 | * | 2/2003 | Min et al. | 375/326 |
| 2003/0086366 A1 | * | 5/2003 | Branlund et al. | 370/208 |
| 2003/0156672 A1 | * | 8/2003 | O'Shea et al. | 375/365 |
| 2004/0042566 A1 | * | 3/2004 | Eidson et al. | 375/341 |
| 2004/0105516 A1 | * | 6/2004 | Smith et al. | 375/354 |

OTHER PUBLICATIONS

Gottfried Ungerboeck, "Channel Coding With Multilevel/Phase Signals", IEEE 1981.*

* cited by examiner

*Primary Examiner*—Mohammed Ghayour
*Assistant Examiner*—Qutub Ghulamali
(74) *Attorney, Agent, or Firm*—Tarolli, Sundheim, Covell & Tummino LLP

(57) ABSTRACT

A decoder of a data signal subjected to phase shifting keying (PSK) modulation uses a plurality of phase locked loops (801-1 to 801-*n*) having an inner decoder for short block codes, at least one of which is adapted to apply excess processing power to process a selected burst of the data signal, such as processing the burst with multiple initial phase/frequency error estimates. A selection circuit identifies the burst and supplies to said one of said plurality of phase-locked loops (801-1 to 801-*n*) for re-processing the bust with excess processing power. An outer Reed-Solomon block decoder (319) may be used to correct errors in the codewords from the phase locked loops and may be used in the selection of the burst by the selection circuit.

32 Claims, 15 Drawing Sheets

DECISION DIRECTED PHASE LOCKED LOOPS (DD-PLL) WITH EXCESS PROCESSING POWER IN DIGITAL COMMUNICATION SYSTEMS

BACKGROUND OF THE INVENTION

1. Field of Invention

The present invention relates to communication systems. In particular, the present invention relates to demodulators which utilize initial phase and/or frequency estimates in a phase locked loop (PLL) tracking the phase and frequency of an input modulated signal.

2. Discussion of the Related Art

In burst communication systems, particularly digital communication systems comprising a communication transmitter for digital data transmission and a communication receiver for digital data reception via a channel, it is known to impress intelligent information to be conveyed onto a carrier for transmission by one of many different modulation techniques, including binary phase shift keying (BPSK) modulation or quaternary phase shift keying (QPSK) modulation. Each burst consists of a preamble portion and a data portion. A demodulator in the communication receiver includes a phase tracking loop (PTL) which determines an initial estimate of the phase of the modulated signal using the preamble portion. The phase tracking loop is initialized with the phase estimate and thereafter constantly calculates an estimate of the transmitter's phase so that it continuously tracks the incoming signal during reception and demodulation of the data portion.

Conventionally, demodulators use one of a number of different phase tracking loops to track and coherently demodulate the modulated signal received from a transmitter so that it may be transformed back into the fixed phase space of the transmitter loops, such as squaring loops, Costas tracking loops, and decision-directed feedback loops for performing phase tracking of either a BPSK or QPSK modulated signal. A commonly used method for performing this type of phase tracking is a digital decision directed phase locked loop (DD-PLL). The basic principle of decision directed phase locked loops (DD-PLLs) is well known as described in the classic "*Telecommunication Systems Engineering*" text by William C. Lindsey and Marvin K. Simon, originally published by Prentice-Hall in 1973, and the "*Digital Communications*" text by Kamilo Feher, originally published by Prentice-Hall in 1983 and republished by Noble Publishing Corp. in 1997. Generally, the input to a digital decision directed phase locked loop (DD-PLL) typically consists of only the phase angles of a sequence of complex data sample pairs obtained by down converting the incoming BPSK or QPSK modulated signal to a baseband quadrature (orthogonal) pair, IQ digit combination, passing these through matched filters and sampling the results at the symbol rate. This sampled pair may be considered as a complex variable in rectangular form. The complex variable is converted to polar form to produce the equivalent variable pair. The apparent incoming phase is referenced to the currently estimated phase (i.e. the tracked phase) to form the phase difference. The phase difference between the incoming phase and the estimated phase is influenced by the true difference between the phase systems of the transmitter and the receiver, by phase and thermal noise present at the receiver, and also by the symbol's data content which changes the angle by a multiple of $\pi/2$ for QPSK or of $\pi$ for BPSK. The polar form is then transformed back into the rectangular form, for subsequent processing, including soft decision decoding when error control is being utilized.

In conventional phase tracking circuits, the effect of the data content on the phase difference between the incoming phase and the estimated phase is compensated by making a "hard" decision on the data content of each individual BPSK or QPSK symbol on the rectangular coordinates. A standard phase detector generates phase error measurements for each BPSK or QPSK symbol, based on the hard decision of each symbol. In the absence of noise in the baseband quadrature pair, the estimated phase decision, which is based on each individual BPSK or QPSK symbol, is always correct so that the resultant phase error measurement equals the true difference between the phase systems of the transmitter and the receiver. The value of the resultant phase error measurement is then filtered to yield an updated estimate for use at the next symbol epoch, forming a classical servo loop.

When information is modulated onto a carrier by a binary phase shift keying (BPSK) or quaternary phase shift keying (QPSK) modulation technique, and a BPSK or QPSK modulated signal is transmitted from the transmitter, the phase space of the receiver generally differs from that of the transmitter due to frequency differences between the local oscillators at the transmitter and receiver and the effect of varying delays and frequency shifts in the propagation path between the two sites. The performance of the demodulator in the communications receiver is sensitive to frequency errors between the incoming signal and the demodulator's reference frequency. Increasing frequency error reduces the possibility that the demodulator will successfully demodulate and decoder the data portion of the incoming signal. In addition, noise is always present so that the resultant phase error measurement may be grossly distorted, especially when an incorrect decision is made in converting the phase difference between the incoming phase and the estimated phase to the resultant phase error measurement. As long as the bit error rate (BER) is small, many existing symbol-by-symbol decision directed phase locked loops (DD-PLLs) perform well. However, at low signal-to-noise ratios, the BER can be relatively high which means that the initial phase detection and estimate from the preamble portion of the signal can be quite unreliable. The initial phase error can be as much as +/–30 degrees when phase tracking of the data portion begins. A high initial phase error results in high codeword error rates because it is difficult for the phase locked loop to lock and to correct for large phase errors. The effect of large initial phase errors, together with the large amount of noise entering the loop, may cause the demodulator to perform unacceptably when demodulating and decoding the beginning of the data portion than during the remainder of the data portion. Indeed, the presence of large phase errors, either initially or during tracking, typically results in dropped cells. For burst communication systems, such as time division multiplexed access (TDMA), and especially for satellite communication systems with low signal-to-noise ratios, there is a need to reliably demodulate and decode the data portion of each burst and to reduce the number of dropped cells and the cell loss rate (CLR). Eliminating large errors in the initial phase estimates in the demodulator phase tracking loop can reduce the number of dropped cells. However, in some communications systems, a CLR of $10^{\wedge}(-4)$ or $10^{\wedge}(-3)$ is unacceptable and the CLR requirement can be as stringent as $10^{\wedge}(-8)$. This requirement is difficult because it only allows one in a hundred million cells to be dropped due to effects other than thermal noise. Additional powerful processing techniques may be utilized in the demodulator to achieve more stringent CLR requirements, but much of the processing power is wasted on bursts which may be adequately demodulated and decoded by less powerful techniques and the implementation of the processing power is inefficient.

For at least the above reasons, conventional decision directed phase locked loops (DD-PLLs) may fail to adequately track the phase of a phase shift keying (PSK) modulated signal, and to minimize the error rate for recovered data, especially significant errors which result in dropped cells and unacceptably high CLR. This consequence is particularly damaging for digital communication systems such as satellite communication systems that utilize error correcting codes and large constellation signal sets to communicate at very low signal-to-noise ratios. During testing, it was observed that the failure rate of the demodulation process was relatively high due to errors in codewords at the beginning of the phase tracking operation. FIGS. 8A–8H are diagrams graphically illustrating the probability of a decoding error for each codeword for various sets of variables which specify fain settings used in the DD-PLL.

BRIEF SUMMARY OF THE INVENTION

Accordingly, it is an object of the present invention to provide a demodulator for a communications receiver which is sensitive to both phase and frequency errors in the phase tracking of an incoming modulated signal and which eliminates large errors in the initial phase estimates of a phase locked loop.

It is further an object of the present invention to provide a demodulator which improves cycle slip and cell loss rate (CLR) for communications systems when tracking the phase of a phase shift keying modulated signal.

It is yet further an object of the present invention to provide a demodulator for a communications receiver which identifies cells of an incoming signal which are likely to be dropped due to, for example, unacceptably large initial phase estimate errors and selectively apply excess processing power to the cells, such as by processing the incoming signal with a range of multiple initial phase and frequency estimates.

These and other objects of the present invention may be achieved by a demodulator for use in a data communication system, comprising a plurality of phase locked loops, each having a first block decoder configured to decode bursts of the input modulated signal at a decode rate to generate a set of associated codewords and a phase/frequency error estimate, wherein one of said plurality of phase locked loops is adapted to selectively apply excess processing power to a burst of said input modulated signal; and a selection circuit which identifies a burst of said input modulated signal to be demodulated with excess processing power, said selection circuit providing said identified burst to said one of said plurality of phase locked loops which is adapted to selectively apply excess processing power in order to re-process said burst of said input modulated signal.

In accordance with another aspect of the present invention, an incoming phase of an input modulated signal encoded by a sequence of codewords may be accurately tracked using a demodulator demodulating an input modulated signal from a transmission channel which is encoded by a sequence of codewords, comprising a plurality of phase locked loops which provide respective estimates of the phase of a burst of said input modulated signal, one of said phase locked loops receiving a burst of the input modulated signal and calculating a phase estimate using a different combination of frequency and initial phase estimate and comprising a first block decoder which decodes the set of vector pairs of the burst of said input modulated signal at a decode rate to generate a set of associated codewords and a phase/frequency error estimate; and a second block decoder which receives the phase/frequency estimates from said plurality of phase locked loops, wherein one of the bursts is selected based on the decoding of the second block decoder and provided to said one of said plurality of phase locked loops to be re-processed with excess processing power.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
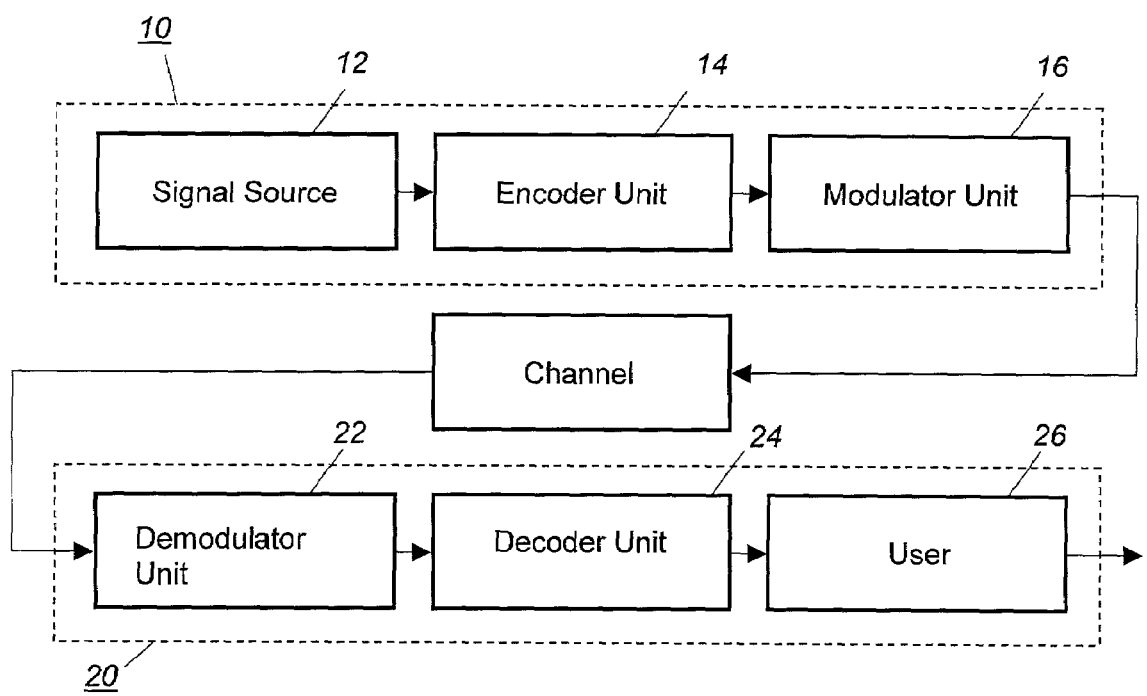
FIG. 1 illustrates an exemplary data communication system comprising a transmitter for digital data transmission and a receiver for digital data reception via a transmission channel.

FIG. 1 of the drawings illustrates a model of an exemplary digital communication system for digital data communications. As shown in FIG. 1, the digital communication system comprises a transmitter 10 for digital data transmission and a receiver 20 for digital data reception via a transmission channel. The transmitter 10 includes an information source 12 for sending information or data in terms of samples, an encoder unit 14 for encoding data samples into data symbols comprised of binary digits (bits), and a modulator unit 16 for modulating the data symbols into a set of signals in accordance with a carrier using various digital modulation techniques such as either binary phase shifting keying (BPSK) or quaternary phase shift keying (QPSK) modulations for radio transmission via a channel. Data samples may be encoded by several available methods including the use of a generator matrix, the use of a feedback shift register with an equivalent generator polynomial, or the use of a look-up table.

The receiver 20 includes a demodulator unit 22 for receiving and demodulating an incoming binary phase shift keying (BPSK) or quaternary phase shift keying (QPSK) modulated signal as a sequence of binary digits, and a decoder unit 24 for decoding the binary digits from the demodulator unit 22 to recover data samples of original data for user 26. Demodulator unit 22 may include a down-converter for down converting an incoming BPSK or QPSK modulated signal into an intermediate frequency signal, a synchronous demodulator for demodulating an intermediate frequency signal from a form of a baseband quadrature pair (p(t), q(t)) into a sequence of complex sample pairs (p(j), q(j)), and a matched filter & sampler (or cross-correlators) for passing the sequence of complex sample pairs (p(j), q(j)) and sampling the results at the jth symbol epoch. Cross-correlators may preferably be used in lieu of the matched filters for passing the sequence of complex sample pairs (p(j), q(j)). This sample pair may be considered as a complex variable in rectangular form.

When the BPSK or QPSK modulated signal is sent on a carrier from the transmitter 10, the phase space of the receiver 20 is generally different from that of the transmitter 10 due to frequency difference between the local oscillators at the transmitter 10 and receiver 20 and the effect of varying delays and frequency shifts in the propagation path between the two sites. To coherently demodulate the received signal at the receiver 20, the demodulator unit 22 commonly uses a decision directed phase locked loop (DD-PLL) for forming an estimate of the phase of the transmitter 10 so that the tumbling received signal may be transformed back into the fixed phase space of the transmitter 10.

Figure 2:
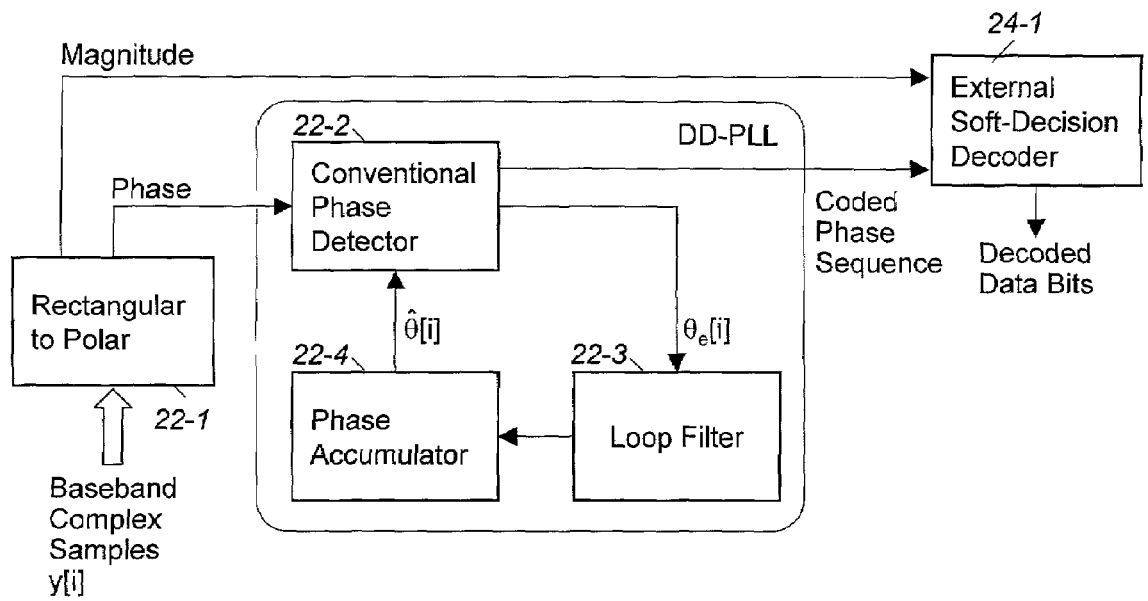
FIG. 2 illustrates a conventional decision directed phase locked loop (DD-PLL) with an external soft-decision decoder unit.

FIG. 2 illustrates a conventional decision directed phase locked loop (DD-PLL) in demodulator 22 for performing phase tracking of either a BPSK or QPSK modulated signal from the transmitter 10. A rectangular to polar converter 22-1 converts baseband complex samples into equivalent variable pairs of magnitude and phase signals. The decision directed phase locked loop receives only the phase angles of the received complex samples for operation. A conventional phase detector 22-2, loop filter 22-3, and phase accumulator 22-4 constitute the phase locked loop. The apparent incoming phase is referenced to the current tracked phase loop to yield a phase difference and output a coded phase sequence.

The value of the phase difference between the incoming phase and the tracked phase is influenced by the true difference between the phase systems of the transmitter 10 and the receiver 20, by phase and thermal noise present at the receiver 20, and also by the symbol's data content which changes the angle by a multiple of $\pi/2$ for quaternary phase shift keying (QPSK) or of $\pi$ for binary phase shift keying (BPSK). The stabilized observation in polar coordinates of an input modulated signal is typically transformed back into the rectangular form by a polar-to-rectangular converter for subsequent processing, including soft decision decoding when error control is being utilized. As shown in FIG. 2, a soft-decision decoder unit 24-1 external and subsequent to the decision directed phase locked loop of demodulator 22 receives the coded phase sequence from the phase locked loop and the magnitude signals from the rectangular to polar converter.

In basic decision directed phase locked loops (DD-PLLs), the effect of the data content is compensated by making a "hard" decision on the data content of the symbol. Conceptually, the resultant bit or dibit decision is used to derotate and place the result in a reference half-plane or quadrant, (for BPSK or QPSK, respectively). For purposes of discussion, the input modulated signal as described by the invention is a quaternary phase shift keying (QPSK) modulated signal. However, a binary phase shift keying (BPSK) modulated signal is also intended with minor variations. In fact, the derotation is usually effected by changing the signal in multiples of $\pi/2$ until such time as the resultant phase error is in the range of $-\lambda/4$ to $+\lambda/4$, which is tantamount to forming the "hard decision" referred to above.

In the absence of noise in a sequence of complex sample pairs, the decision is always correct so that the resultant error estimate equals the true difference between the phase systems of the transmitter 10 and the receiver 20. The value is then filtered to yield an updated estimate for use at the next symbol epoch, forming a classical servo loop. In all practical communication systems, however, noise is always present so that the resultant error estimate may be grossly distorted, especially when the wrong decision is made in converting the phase difference between the incoming phase and the currently tracked phase to the resultant error estimate. So long as the error rate is small, these exemplary decision directed phase locked-loops (DD-PLLs) perform satisfactorily. However, at low signal to noise ratios, the effect of wrong or incorrect decisions further exacerbates the degradation of tracking loop performance resulting from the large amount of noise entering the phase locked loop (PLL), and causes the tracking loop performance to degrade. In fact, the variance of the recovered variable increases faster than the signal to noise ratio degrades. This result is particularly damaging for communication systems that utilize large constellation signal sets to communicate at very low signal to noise ratios—as, for example, with error correcting block codes.

In the basic decision directed phase locked loop (DD-PLL) as shown in FIG. 2, each decision is based on an individual symbol basis, on the tacit assumption that the data content is statistically independent from epoch to epoch. When coding is used, however, such an assumption is sub-optimum, since the data content of a set of symbols may be linked together over several epochs because of the redundancy present in the code. A short block code, such as the (8,4) biorthogonal binary code (also known as a Reed-Muller code and by other aliases), can be used and recovered by a maximum likelihood decision based on a set of eight (8) soft decisions from four symbols, assuming that quaternary phase shift keying (QPSK) modulated signal is used. (The Reed-Muller codes are described in the following references: Mitani, N. "On the Transmission of Numbers in a Sequential Computer," Delivered at the National Convention of the Institute of Electrical Communication Engineers of Japan, November 1951; Honda, N., "The Sequential Error-Correcting Code," Sci. Repts. Tohoku Univ., Series B, 8 no. 3,1956; Slepian, D., "A Class of Binary Signaling Alphabets," Bell System Tech. J., 35, 203–234, 1956; Slepian, D., "A Note on Two Binary Signaling Alphabets," IRE Trans., IT-2, 84–86, 1956; Reed, I. S., "A Class of Multiple-Error-Correcting Codes and the Decoding Scheme," IRE Trans., PGIT-4, 38–49,1954; and Muller, D. E., "Application of Boolean Algebra to Switching Circuit Design and Error Detection," IRE Trans., Ec-3, 6–12, 1954.) However, other specific block codes may also be used in lieu of the Reed-Muller biorthogonal codes. In principle, any (n, k) block code may be used in lieu of the (8, 4) biorthogonal code described herein as the preferred embodiment of the present invention. Examples may include the Extended Hamming (12,8) code (described in: Golay, M. J. E., "Notes on Digital Coding," Proc. IEEE, 37, 657, 1949; Golay, M. J. E., "Anent Codes, Priorities, Patents, etc.," Proc. IEEE, 64, 572, 1976; and Hamming, R. W., "Error Detecting and Error Correcting Codes," Bell Syst. Tech. J., 29, 147–160, 1950) and the Nordstrom-Robinson (16,8) code (described in Nordstrom, A. W., and J. P. Robinson, "An Optimum Non-linear Code," Info. And Control, 11, 613–616, 1967). Codes with "k" larger than eight (8) are of reduced interest for many applications where the block code referred to in the present invention often forms the inner code in a concatenated code structure having a Reed Solomon code over GF ($2^8$) as the outer code. Also codes with large "n" are of reduced interest because, as subsequently described, the update rate of the phase locked loop of the present invention is once per codeword epoch (rather than once per symbol epoch of an exemplary decision directed phase locked loop), and this update rate may not be made very low since any frequency offset must be corrected.

In order to improve the performance of the decision directed phase locked loop (DD-PLL) at low signal-to-noise ratios, an improved decision directed phase locked loop (DD-PLL) has been proposed in U.S. Pat. No. 6,236,687, commonly assigned to TRW Inc., the assignee of this patent application, and hereby incorporated by reference in its entirety, that utilizes a block decoder inside the phase locked loop. As is known from the subject matter incorporated by reference, the improved decision directed phase locked loop (DD-PLL) comprises a block decoder, such as a Reed-Muller block decoder, for decoding the set of vector pairs of phase stabilized observables in rectangular form at a decode rate to generate decoded data. The decoded data at each codeword is provided to the loop filter 22-3 to yield an update of an estimated phase at every codeword.

Figure 3:
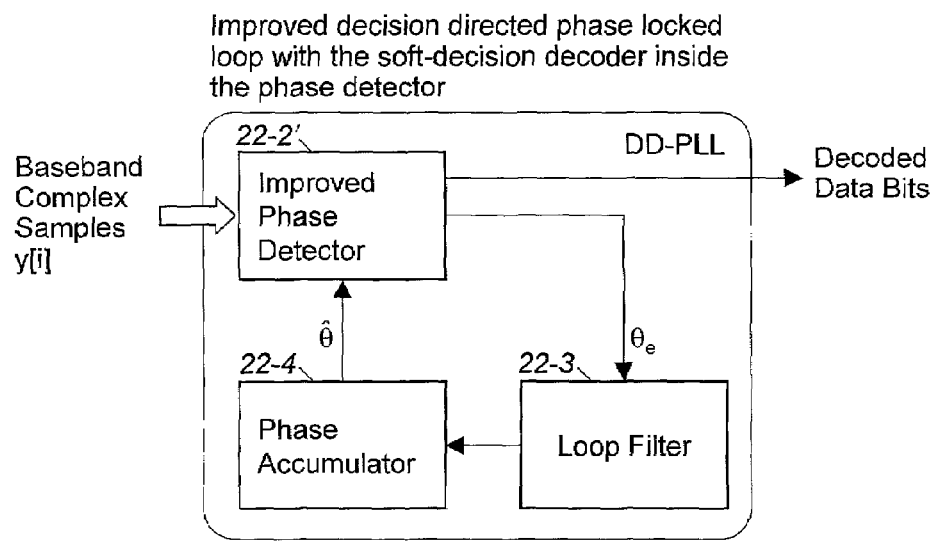
FIG. 3 is a circuit diagram of a preferred embodiment of a communications receiver in which the preferred embodiments of the invention may be practiced.

Unlike the conventional decision directed phase detector, where data decisions are made on a symbol-by-symbol basis, the improved phase detector 22-2' in FIG. 3 operates on a group of symbols (or a codeword) at a time. It requires both the real and imaginary (or magnitude and phase) components of the received complex samples for soft-decision decoding. The conventional phase detector 22-2, on the other hand, only requires the phase angles of the received complex samples for operation. Since coded decisions are generally more reliable than uncoded decisions, a lower error rate is achieved with coding which in turn causes the tracking loop performance to improve.

Figure 4:
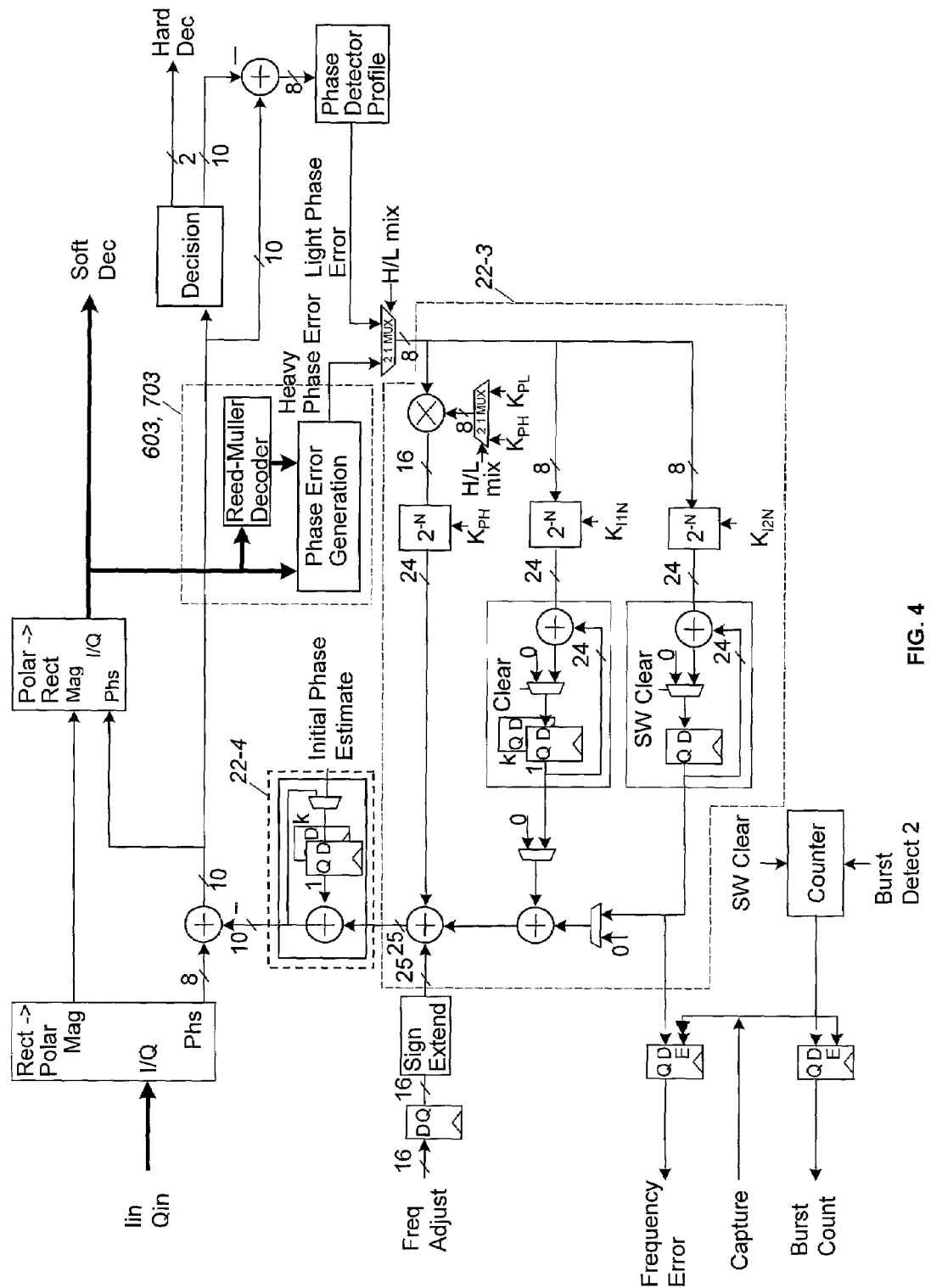
FIG. 4 is a more detailed diagram of the preferred embodiment shown in the circuit diagram of FIG. 3.
Figure 5:
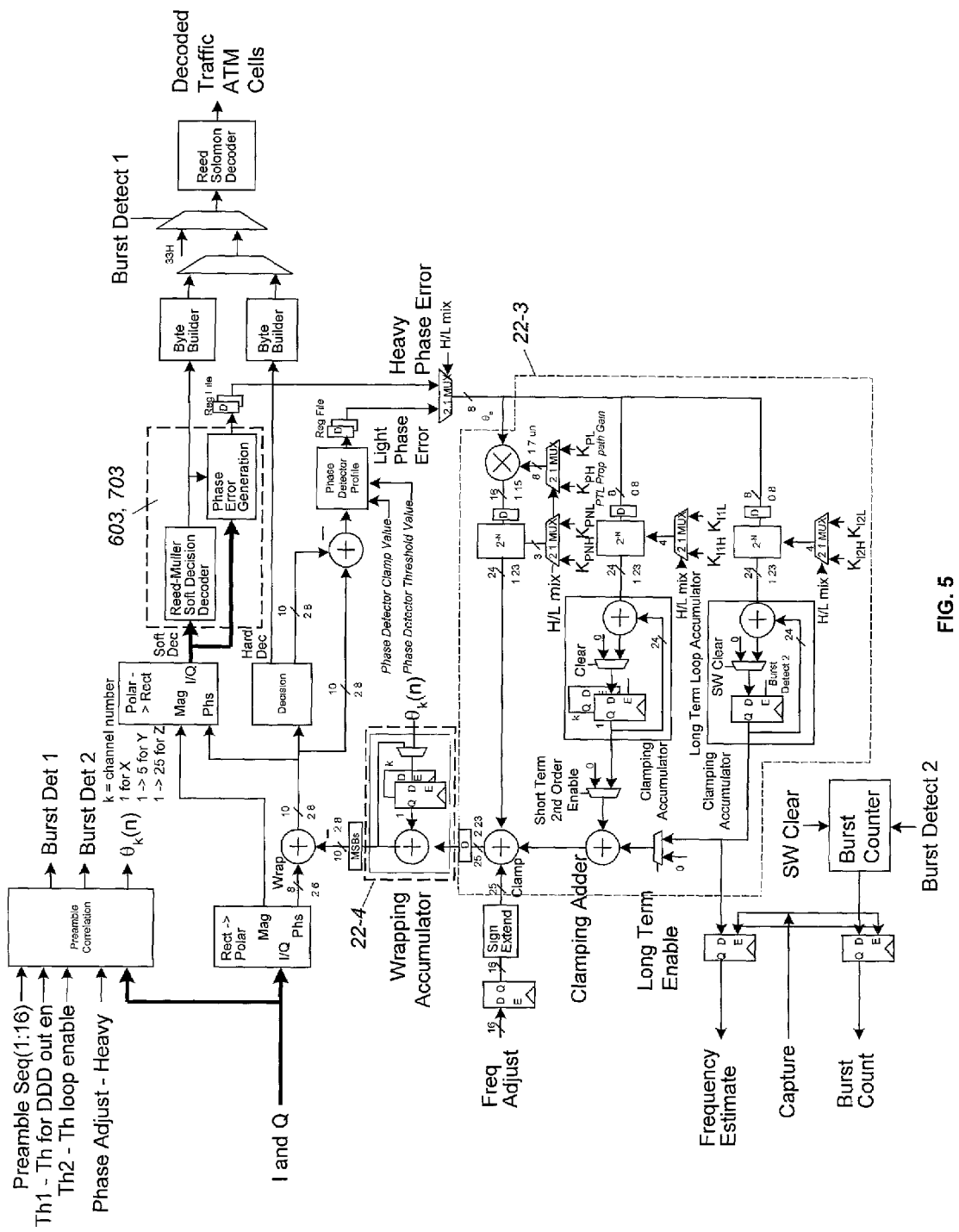
FIG. 5 illustrates an improved decision directed phase locked loop with the soft-decision decoder insider the phase detector.

Of course, as described above, the phase locked loop is not a standalone circuit and must be implemented in a communications receiver along with other circuits. FIGS. 4 and 5 shows a circuit environment including a phase locked loop, such as the phase locked loop shown in FIG. 3, with an inner block decoder, such as a Reed-Muller decoder, for use with short block codes and an outer Reed-Solomon block decoder. The inner block decoder is shown in further detail with respect to the preferred implementations therefore in FIGS. 6 and 7. The details of appropriate embodiments of loop filter 22-3 and phase accumulator 22-4 are shown in FIGS. 4 and 5. However, other embodiments may be utilized as well.

Figure 6:
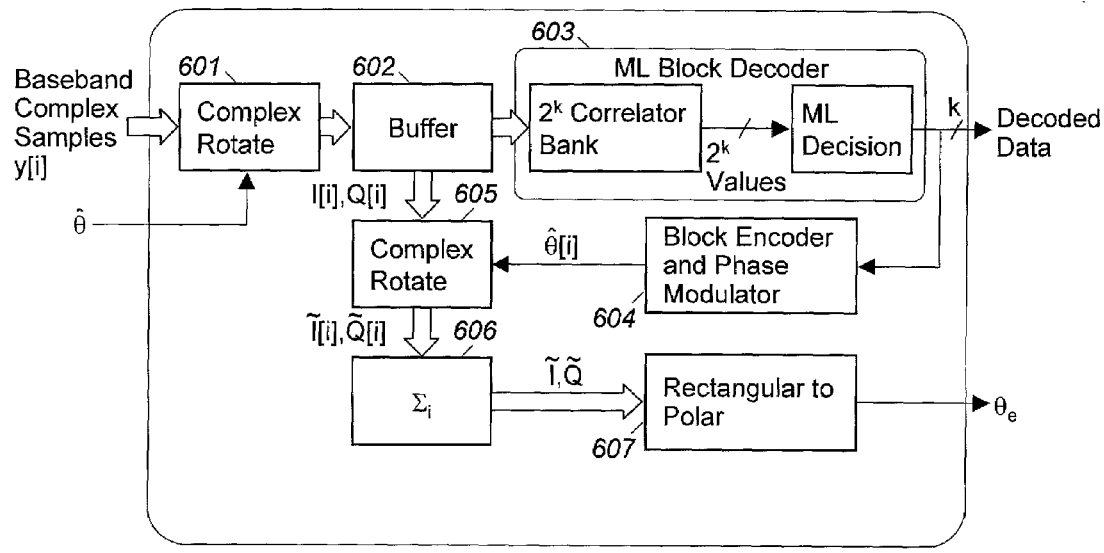
FIG. 6 illustrates a first implementation embodiment of an improved phase detector according to the invention.
Figure 7:
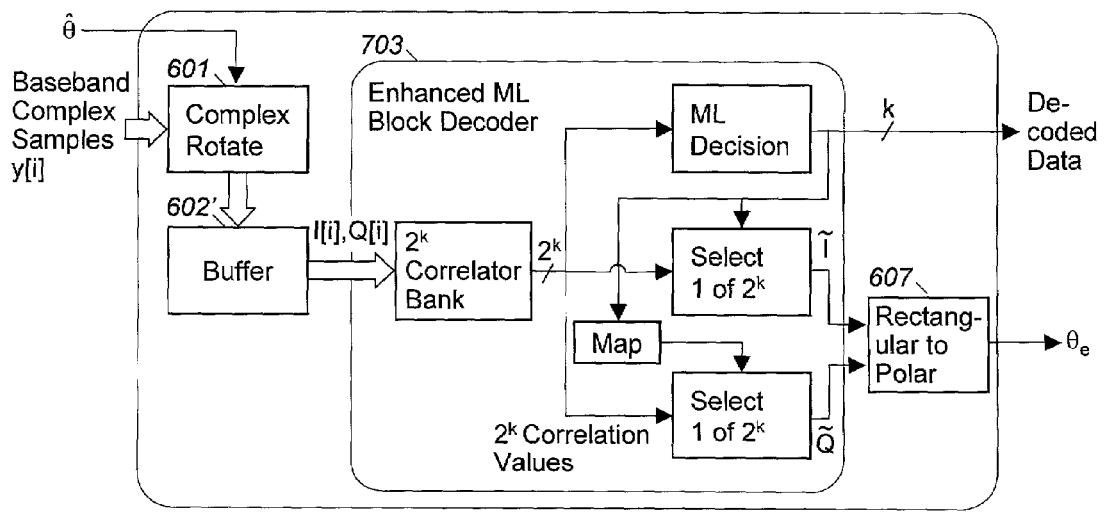
FIG. 7 illustrates a second implementation embodiment of an improved phase detector according to the invention.
Figure 8A:
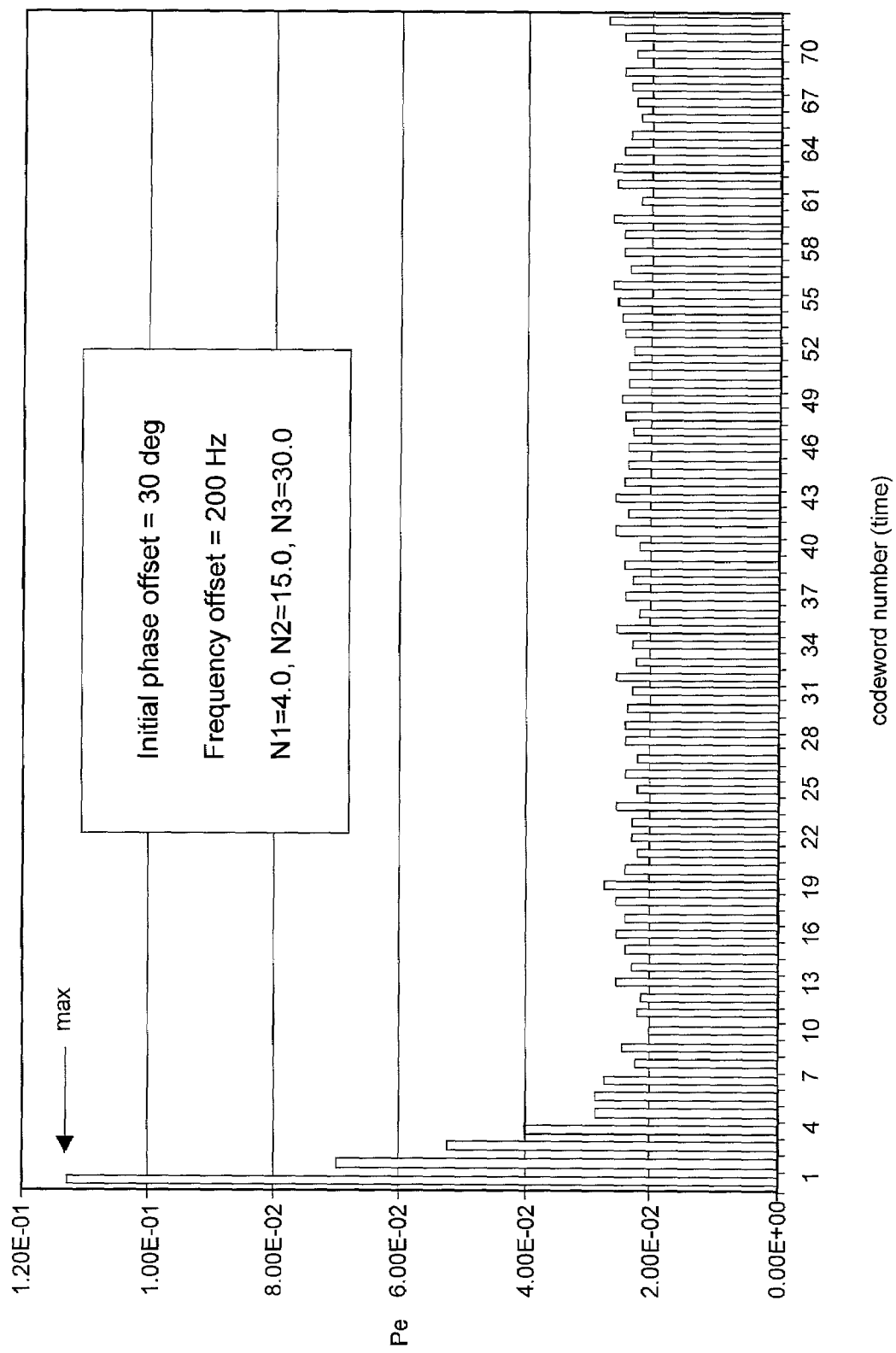
FIGS. 8A–8H are diagrams illustrating the probability of a decoding error in a codeword generated by a Reed-Muller decoder located with a phase locked loop for respective sets of variables.
Figure 8B:
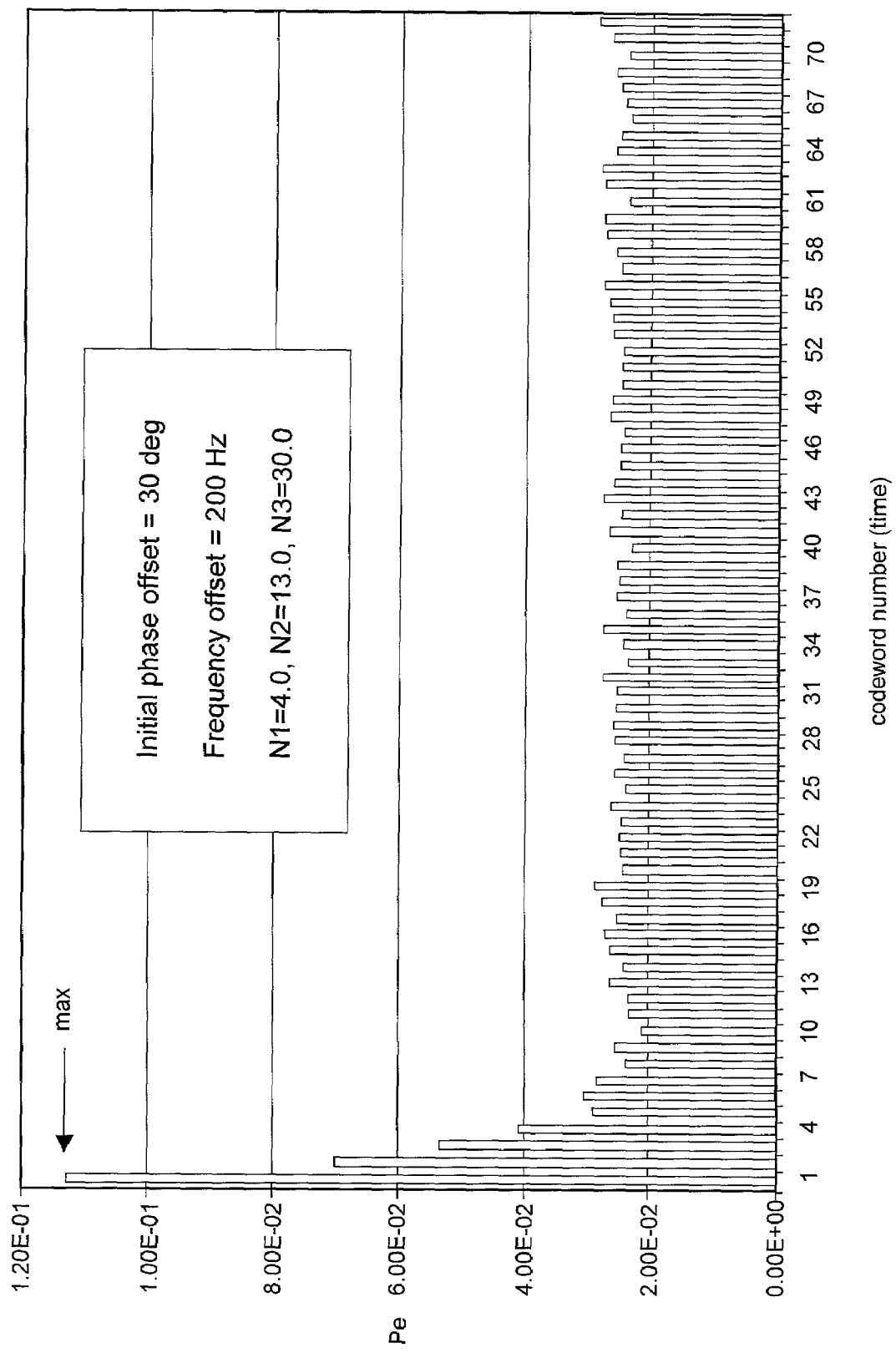
Figure 8C:
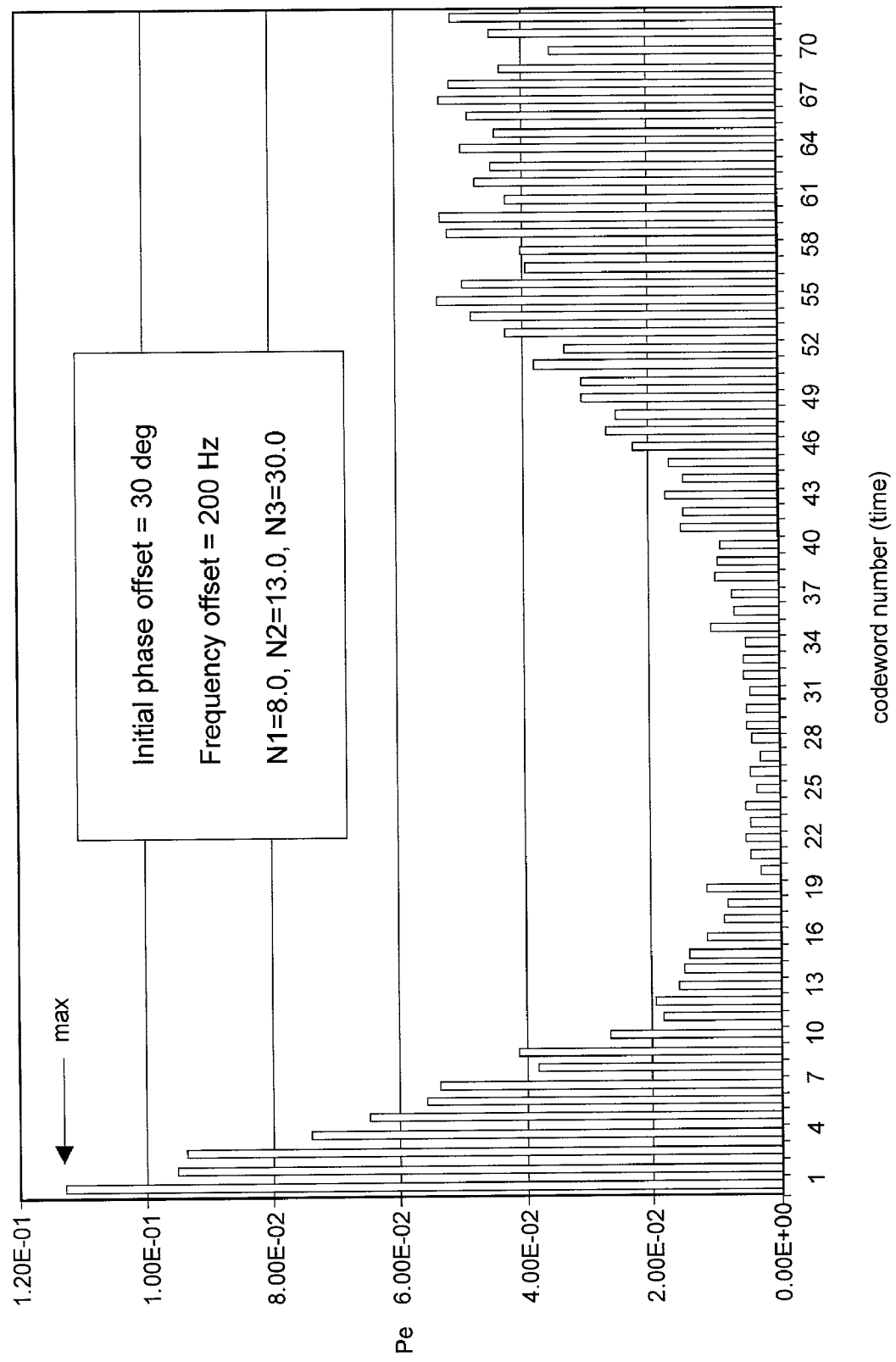
Figure 8D:
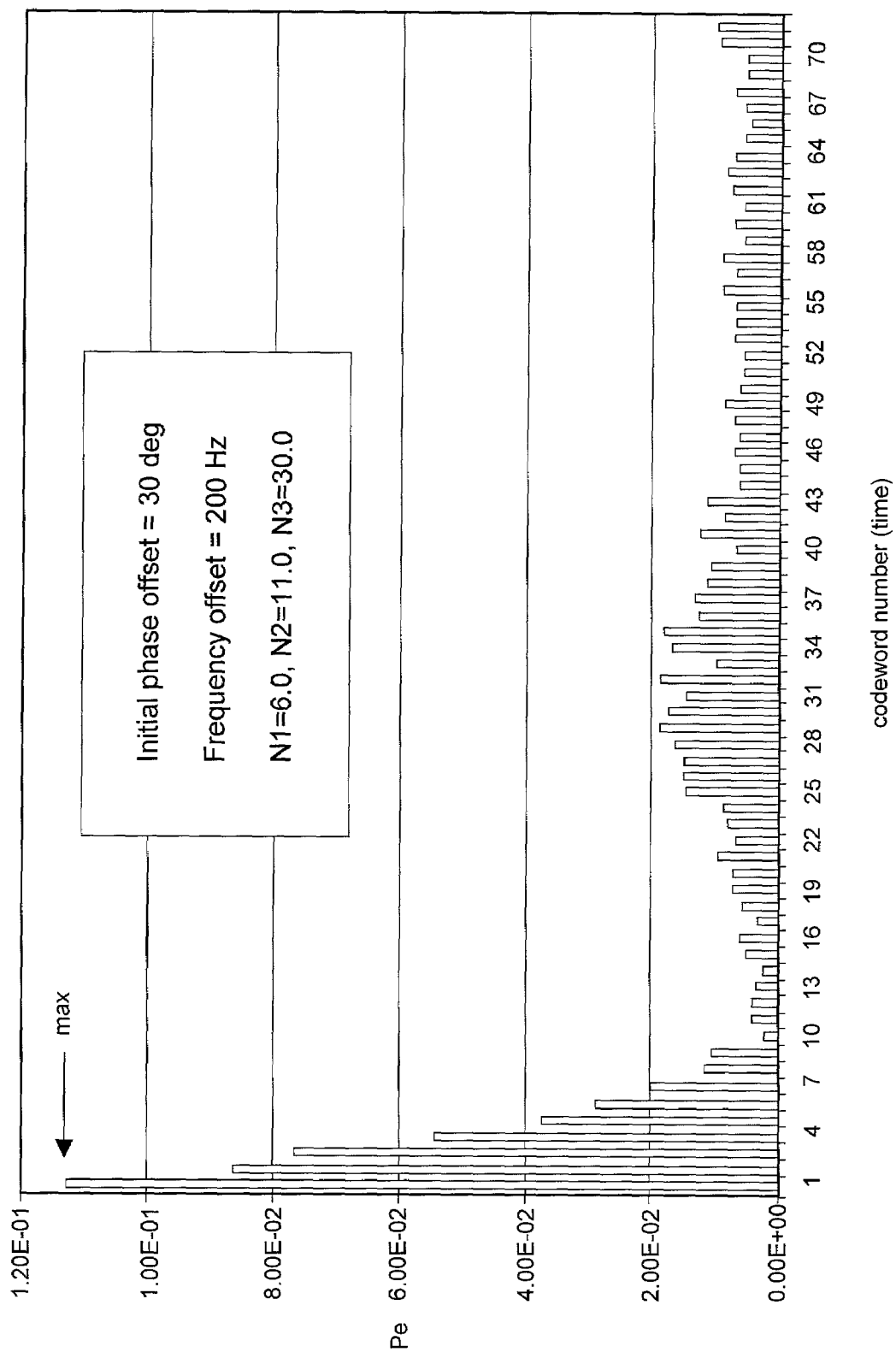
Figure 8E:
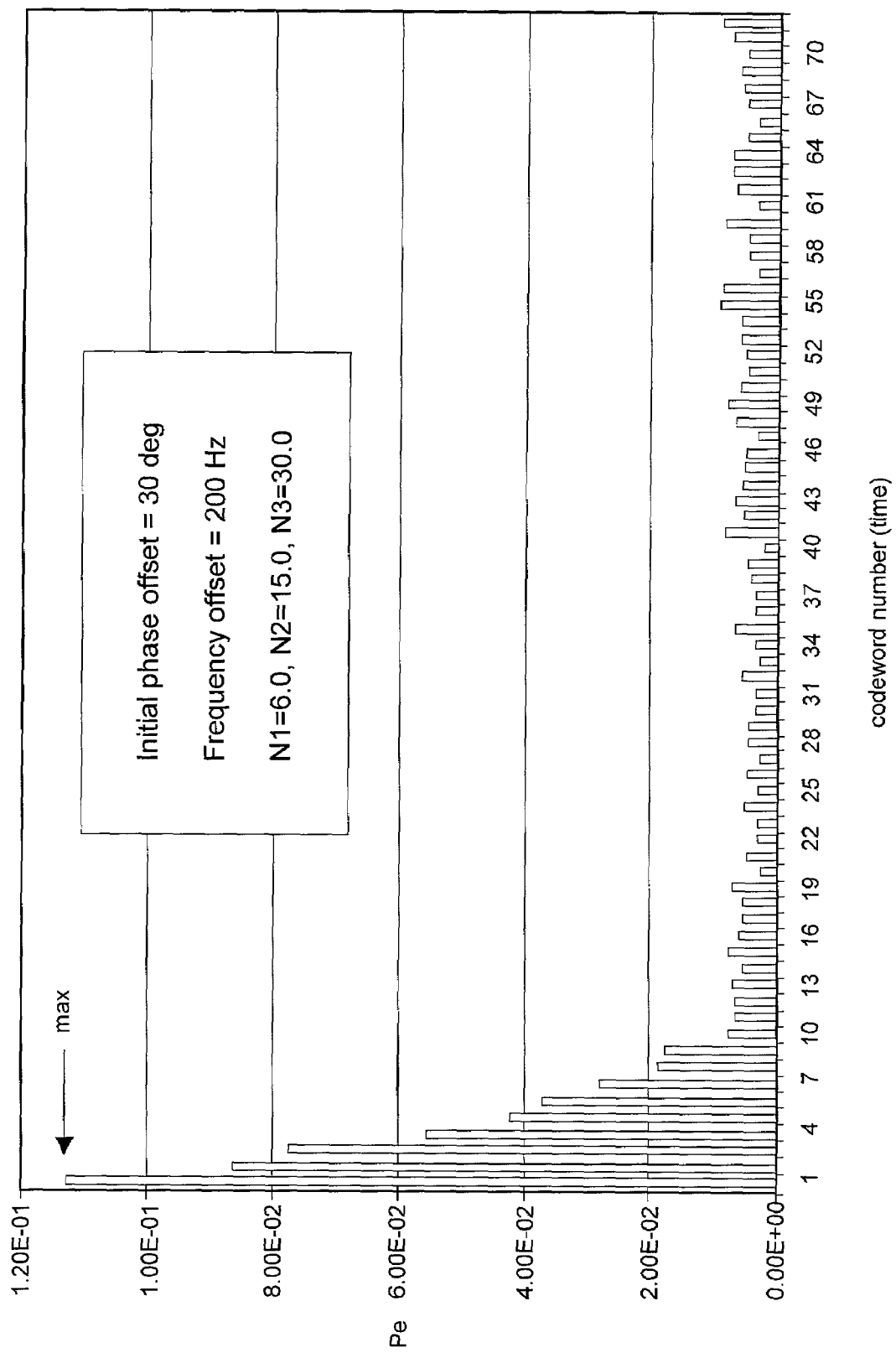
Figure 8F:
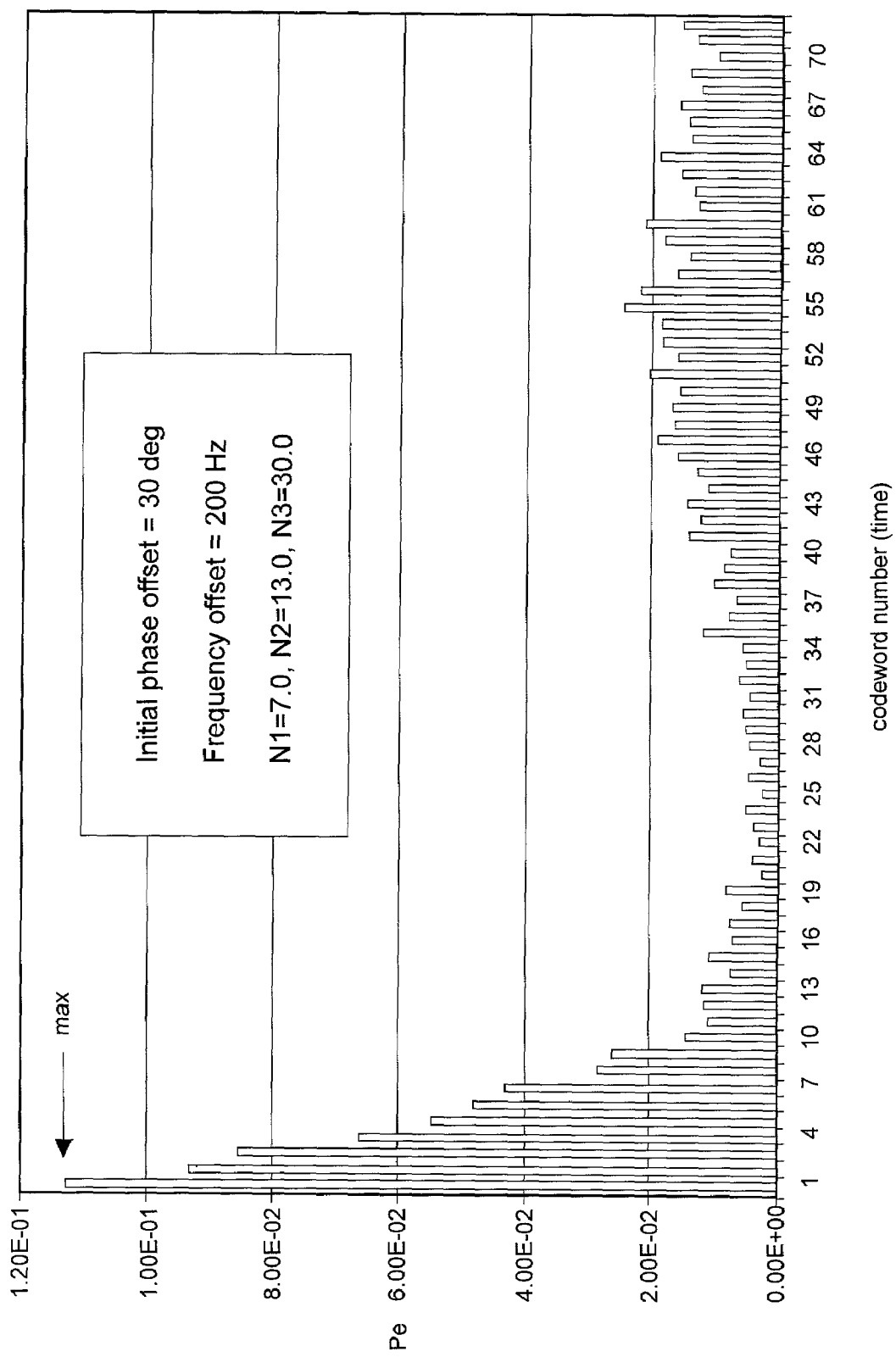
Figure 8G:
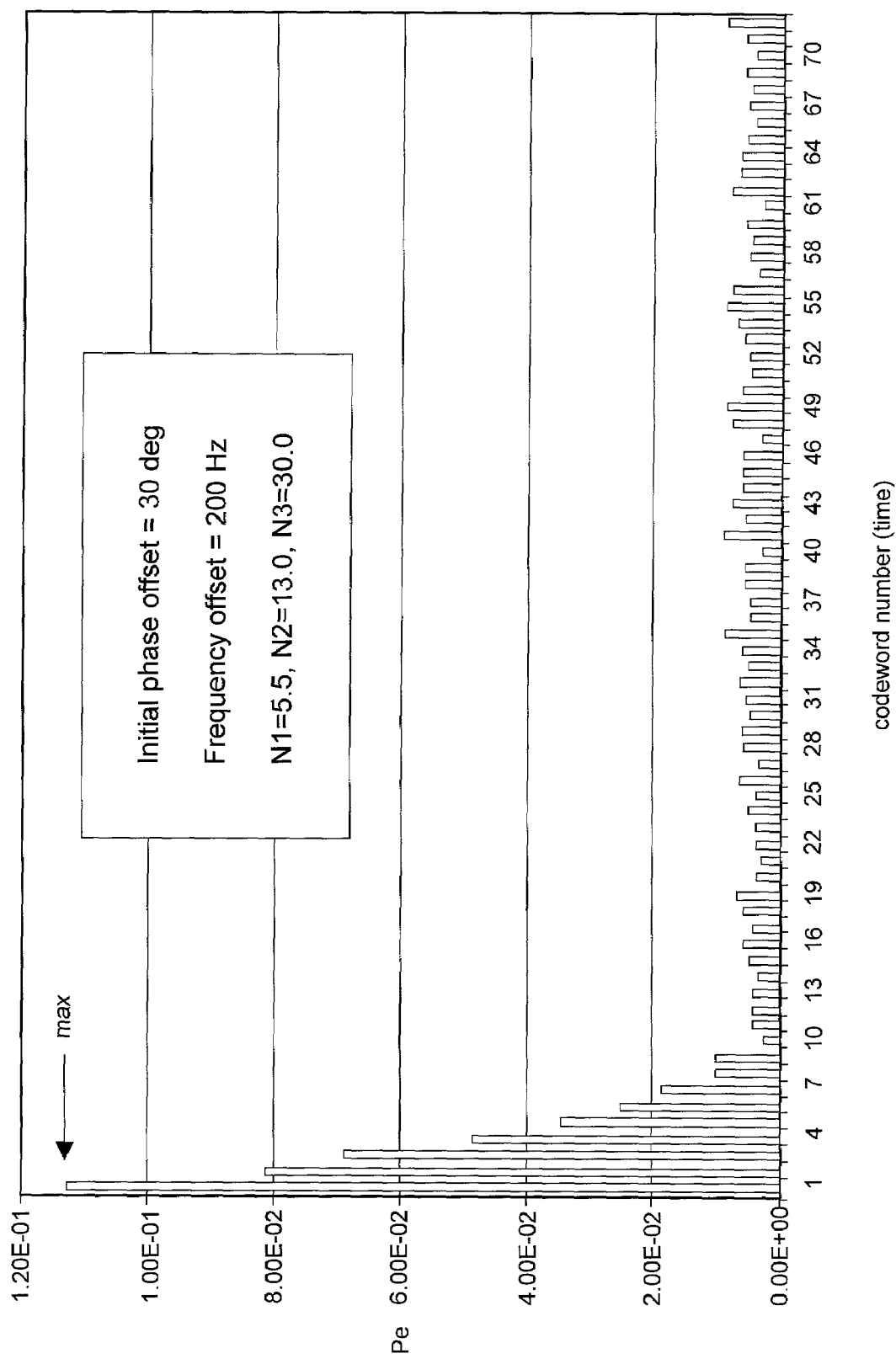
Figure 8H:
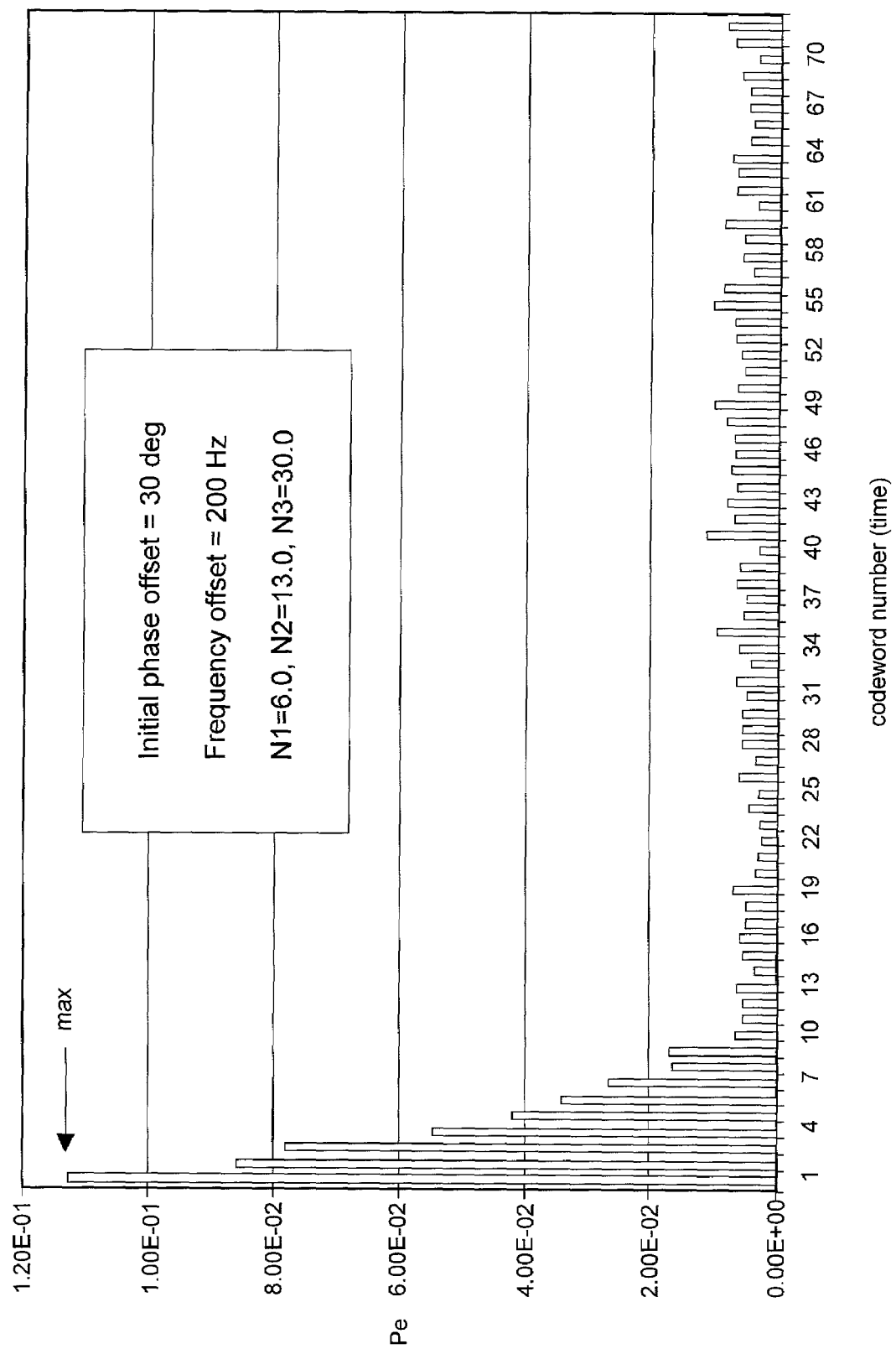

We will next discuss the preferred implementations of the phase locked loop shown in FIGS. 6 and 7. In order to explain the operation of the embodiments in FIGS. 6 and 7, we shall consider as an example the bi-orthogonal rate 4/8 Reed-Muller (RM) block code and the Quadrature Phase Shift Keying (QPSK) modulation scheme. Of course, other codes such as Nordstrom-Robinson, Golay and quadratic residue codes may also be used.

The block encoding operation at the transmitter consists of grouping the sequence of binary information data into blocks of 4 bits, and then determining the 8 bit codeword associated with each of the blocks. Since there are 16 possible 4-bit patterns, this task may be accomplished by using a so called codeword lookup table as shown below:

| Information Bit Pattern | Associated Codeword |
| --- | --- |
| 0 0 0 0 | 0 0 0 0 0 0 0 0 |
| 0 0 0 1 | 0 0 0 0 1 1 1 1 |
| 0 0 1 0 | 0 0 1 1 0 0 1 1 |
| 0 0 1 1 | 0 0 1 1 1 1 0 0 |
| 0 1 0 0 | 0 1 0 1 0 1 0 1 |
| 0 1 0 1 | 0 1 0 1 1 0 1 0 |
| 0 1 1 0 | 0 1 1 0 0 1 1 0 |
| 0 1 1 1 | 0 1 1 0 1 0 0 1 |
| 1 0 0 0 | 1 1 1 1 1 1 1 1 |
| 1 0 0 1 | 1 1 1 1 0 0 0 0 |
| 1 0 1 0 | 1 1 0 0 1 1 0 0 |
| 1 0 1 1 | 1 1 0 0 0 0 1 1 |
| 1 1 0 0 | 1 0 1 0 1 0 1 0 |
| 1 1 0 1 | 1 0 1 0 0 1 0 1 |
| 1 1 1 0 | 1 0 0 1 1 0 0 1 |
| 1 1 1 1 | 1 0 0 1 0 1 1 0 |

In digital communication, modulation is often represented by mapping patterns of 0's and 1's onto a set of complex numbers also referred to as signal constellation points. For example in Quadrature Phase Shift Keying (QPSK), 2-bit patterns determine one of 4 possible constellation points according to the table:

| 2-Bit Pattern | Constellation Point |
| --- | --- |
| 0 0 | +1+j |
| 0 1 | +1−j |
| 1 0 | −1+j |
| 1 1 | −1−j |

Since modulation is performed on the coded binary sequence, each of the possible codewords may be mapped, using the Quadrature Phase Shift Keying (QPSK) mapping, in order to obtain what is called the modulated codeword lookup table:

| Information<br>Bit Pattern | Associated<br>Codeword | Associated<br>Modulated Codeword |
|---|---|---|
| 0 0 0 0 | 0 0 0 0 0 0 0 0 | +1+j +1+j +1+j +1+j |
| 0 0 0 1 | 0 0 0 0 1 1 1 1 | +1+j +1+j −1−j −1−j |
| 0 0 1 0 | 0 0 1 1 0 0 1 1 | +1+j −1−j +1+j −1−j |
| 0 0 1 1 | 0 0 1 1 1 1 0 0 | +1+j −1−j −1−j +1+j |
| 0 1 0 0 | 0 1 0 1 0 1 0 1 | +1−j +1−j +1−j +1−j |
| 0 1 0 1 | 0 1 0 1 1 0 1 0 | +1−j +1−j −1+j −1+j |
| 0 1 1 0 | 0 1 1 0 0 1 1 0 | +1−j −1+j +1−j −1+j |
| 0 1 1 1 | 0 1 1 0 1 0 0 1 | +1−j −1+j −1+j +1−j |
| 1 0 0 0 | 1 1 1 1 1 1 1 1 | −1−j −1−j −1−j −1−j |
| 1 0 0 1 | 1 1 1 1 0 0 0 0 | −1−j −1−j +1+j +1+j |
| 1 0 1 0 | 1 1 0 0 1 1 0 0 | −1−j +1+j −1−j +1+j |
| 1 0 1 1 | 1 1 0 0 0 0 1 1 | −1−j +1+j +1+j −1−j |
| 1 1 0 0 | 1 0 1 0 1 0 1 0 | −1+j −1+j −1+j −1+j |
| 1 1 0 1 | 1 0 1 0 0 1 0 1 | −1+j −1+j +1−j +1−j |
| 1 1 1 0 | 1 0 0 1 1 0 0 1 | −1+j +1−j −1+j +1−j |
| 1 1 1 1 | 1 0 0 1 0 1 1 0 | −1+j +1−j +1−j −1+j |

We shall call the complex numbers of a modulated codeword the transmitted symbols, because they represent, in a mathematically equivalent way, the actual waveform transmitted through the communication channel. The transmitted symbols may experience multiplicative distortions of amplitude and phase as well as additive disturbances due to thermal noise in both the real and imaginary components. Focusing on the transmission of one modulated codeword at a time, the above mentioned channel distortion effects may be described mathematically by the equation:

$$y[i]=\alpha[i]x[i]+n[i] \quad i=1, \ldots, 4$$

where $\alpha[i]$ and $n[i]$ are complex variables representing the multiplicative distortion and the additive noise disturbance respectively. The sequence $x[1] \ldots x[4]$ is the transmitted symbol sequence associated with a codeword (i.e. the modulated codeword) and $y[1] \ldots y[4]$ is the sequence of received symbols.

Phase tracking systems, in general, aim at tracking the angular phase variations of the multiplicative distortion factor $\alpha[i]$ over time. The phase angle of $\alpha[i]$ is called the channel phase and denoted $\theta[i]$. The goal of the decision directed phase locked loop (DD-PLL) is to provide at the receiver an estimate of the channel phase, denoted $\hat{\theta}[i]$, which can then be used to rotate the received symbols $y[i]$ by an equal amount but in the opposite direction as the channel phase. If the channel phase estimates are accurate, the phase distortion effects introduced by the channel can be significantly reduced prior to block decoding.

In the conventional decision directed phase locked loop (DD-PLL) shown in FIG. 2, only the phase angles of the received complex symbols $y[i]$ are processed by the loop on a symbol by symbol basis. The phase detector 22-2 internally subtracts the phase estimate of the loop $\hat{\theta}[i]$ from the received phase and makes a decision as to which of the four QPSK phases is the most likely. The phase decisions are then provided to external decoder 24-1 along with magnitudes of the received symbols $y[i]$ for soft decision block decoding. The phase detector 22-2 further subtracts the decided QPSK phase from the received phase in order to remove the phase variation due to data modulation. The residual phase $\theta_e[i]$ becomes the feedback phase error term that is filtered by the loop filter 22-3 and added in by the phase accumulator 22-4 in order to update the loop's channel phase estimate $\hat{\theta}[i]$.

In the improved decision directed phase locked loop (DD-PLL) of FIG. 3, the task of soft-decision block decoding is performed inside the improved phase detector 22-2'.

While the conventional phase detector 22-2 made QPSK decisions on a symbol by symbol basis, the improved phase detector 22-2' collects 4 QPSK symbols and then makes a codeword decision. Since coded decisions are generally more reliable than uncoded decisions, the lower error rate enables the improved phase detector 22-2' to provide a more reliable feedback phase error term, which in turn yields a more accurate estimate of the channel phase.

Unlike conventional Reed-Solomon decoders which have an error correction capability of correcting N random codeword errors, a Reed-Solomon block decoder according to a preferred embodiment of the invention instead corrects (if in error) n specific codewords (called erasures) and N−n/2 random codeword errors. The total erasure plus random error correction capability is greater than the random error correction capability alone. The erasure positions must be specified to the decoder, but this can be done with some confidence if the inner code produces reliability metrics. The specific codeword locations can be pre-selected or they can be chosen based on the reliability metric results from the inner block decoder. In the case of a Reed-Muller inner block decoder, the reliability information can be taken to be the correlation values that are obtained during the decoding process and the selected codewords are selected based on the correlation values. Typically, the first code word needs to be discarded. Thus, instead of selecting the codewords based on reliability information, the Reed-Solomon block decoder can preselect the first codeword or a group consisting of the first codewords based on the knowledge that they are most likely to be in error. In either instance, these code word erasures can increase the error correction capability of the Reed-Solomon decoder allowing for fewer dropped cells.

The improvement in performance achieved by the improved decision directed phase locked loop (DD-PLL) however, comes with much added complexity in the hardware design of the loop. By comparing FIG. 2 and FIG. 3, one can see that the main component affected by the improved design is the phase detector 22-2. A conceptually intuitive implementation of the improved phase detector 22-2' is shown in FIG. 6, and a functionally equivalent but more efficient implementation of the improved phase detector 22-2', as proposed by the current invention, is shown in FIG. 7. The following paragraphs explain why these two implementations are functionally equivalent by tracing the internal operations of FIG. 6, and showing that it produces the same output as FIG. 7.

The first operation performed inside the improved phase detector of FIG. 6 is the rotation of the received samples $y[i]$ in the complex plane by $-\hat{\theta}$. This first de-rotation step is carried out by the complex rotate module 601 and can be expressed mathematically by the linear transformations:

$$\begin{bmatrix} I[i] \\ Q[i] \end{bmatrix} = \begin{bmatrix} \cos(-\hat{\theta}) & -\sin(-\hat{\theta}) \\ \sin(-\hat{\theta}) & \cos(-\hat{\theta}) \end{bmatrix} \begin{bmatrix} \text{Re}\{y[i]\} \\ \text{Im}\{y[i]\} \end{bmatrix} \quad i=1, \ldots, 4$$

Since the loop's channel phase estimate is updated once per codeword, the received symbols $y[1] \ldots y[4]$ are all rotated by the same angle $-\hat{\theta}$, i.e. $\hat{\theta}[i]=\hat{\theta}$ for all $i=1, \ldots, 4$.

The vectors resulting from the first de-rotation step are collected in the buffer 602 and then passed on to the maximum-likelihood (ML) block decoder 603 for soft-decision decoding. The decoder correlates the sequence it receives with all of the 16 possible codewords and selects the one with the largest correlation. The 4-bit information bit pattern associated with the winning codeword is then outputted by the decoder 603. In order to remove the data phase rotations from the received samples, the decoded 4-bit pattern must be re-encoded and phase modulated, just as in the transmitter. This task is performed by the block encoder and phase modulator module 604 which outputs the coded phase angles $\hat{\phi}[i]$, i=1, . . . , 4, associated with the winning modulated codeword.

A second de-rotation step is next performed by the complex rotate module 605 to "wipe-off" the data modulation from the resultant vectors of the first de-rotation step. This step may be written mathematically as:

$$\begin{bmatrix} \tilde{I}[i] \\ \tilde{Q}[i] \end{bmatrix} = \begin{bmatrix} \cos(-\hat{\phi}[i]) & -\sin(-\hat{\phi}[i]) \\ \sin(-\hat{\phi}[i]) & \cos(-\hat{\phi}[i]) \end{bmatrix} \begin{bmatrix} I[i] \\ Q[i] \end{bmatrix} \quad i=1, \ldots, 4$$

Since the phase sequence associated with the winning codeword, $\hat{\phi}[i]$, only takes values on the set $$\left\{ \frac{\pi}{4}, \frac{3\pi}{4}, \frac{5\pi}{4}, \frac{7\pi}{4} \right\},$$

the resultant vectors of the second de-rotation step may equivalently be expressed as:

$$\begin{bmatrix} \tilde{I}[i] \\ \tilde{Q}[i] \end{bmatrix} = \frac{1}{\sqrt{2}} \begin{bmatrix} a_i I[i] + b_i Q[i] \\ c_i I[i] + d_i Q[i] \end{bmatrix} \quad i=1, \ldots, 4$$

where $a_i$, $b_i$, $c_i$ and $d_i$ are the coefficients used to compute $\tilde{I}[i]$ and $\tilde{Q}[i]$. These coefficients are either +1 or −1, and additionally, $a_i = d_i$ and $b_i = -c_i$.

Now that the data phase angles have also been subtracted out of the received signal, the resultant four vectors of the second de-rotation step are added together by the summation module 606 to produce:

$$\begin{bmatrix} \tilde{I} \\ \tilde{Q} \end{bmatrix} = \sum_{i=1}^{4} \begin{bmatrix} \tilde{I}[i] \\ \tilde{Q}[i] \end{bmatrix} = \frac{1}{\sqrt{2}} \begin{bmatrix} \sum_{i=1}^{4} a_i I[i] + b_i Q[i] \\ \sum_{i=1}^{4} c_i I[i] + d_i Q[i] \end{bmatrix}$$

The coefficients $a_i$, $b_i$, and $c_i$, $d_i$ determine whether the terms I[i] and Q[i] should be added or subtracted by the summation to produce $\tilde{I}$ and $\tilde{Q}$. Since these coefficients depend on the winning codeword selected by the block decoder 603, the following table lists the coefficient values for every possible codeword decision:

| Decided Codeword | Coefficients for $\tilde{I}$ | | | | | | | | Coefficients for $\tilde{Q}$ | | | | | | | |
| --- | --- | --- | --- | --- | --- | --- | --- | --- | --- | --- | --- | --- | --- | --- | --- | --- |
| | $a_1$ | $b_1$ | $a_2$ | $b_2$ | $a_3$ | $b_3$ | $a_4$ | $b_4$ | $c_1$ | $d_1$ | $c_2$ | $d_2$ | $c_3$ | $d_3$ | $c_4$ | $d_4$ |
| 0 0 0 0 0 0 0 0 | +1 | +1 | +1 | +1 | +1 | +1 | +1 | +1 | −1 | +1 | −1 | +1 | −1 | +1 | −1 | +1 |
| 0 0 0 0 1 1 1 1 | +1 | +1 | +1 | +1 | −1 | −1 | −1 | −1 | −1 | +1 | −1 | +1 | +1 | −1 | +1 | −1 |
| 0 0 1 1 0 0 1 1 | +1 | +1 | −1 | −1 | +1 | +1 | −1 | −1 | −1 | +1 | +1 | −1 | −1 | +1 | +1 | −1 |
| 0 0 1 1 1 1 0 0 | +1 | +1 | −1 | −1 | −1 | −1 | +1 | +1 | −1 | +1 | +1 | −1 | +1 | −1 | −1 | +1 |
| 0 1 0 1 0 1 0 1 | +1 | −1 | +1 | −1 | +1 | −1 | +1 | −1 | +1 | +1 | +1 | +1 | +1 | +1 | +1 | +1 |
| 0 1 0 1 1 0 1 0 | +1 | −1 | +1 | −1 | −1 | +1 | −1 | +1 | +1 | +1 | +1 | +1 | −1 | −1 | −1 | −1 |
| 0 1 1 0 0 1 1 0 | +1 | −1 | −1 | +1 | +1 | −1 | −1 | +1 | +1 | +1 | −1 | −1 | +1 | +1 | −1 | −1 |
| 0 1 1 0 1 0 0 1 | +1 | −1 | −1 | +1 | −1 | +1 | +1 | −1 | +1 | +1 | −1 | −1 | −1 | −1 | +1 | +1 |
| 1 1 1 1 1 1 1 1 | −1 | −1 | −1 | −1 | −1 | −1 | −1 | −1 | +1 | −1 | +1 | −1 | +1 | −1 | +1 | −1 |
| 1 1 1 1 0 0 0 0 | −1 | −1 | −1 | −1 | +1 | +1 | +1 | +1 | +1 | −1 | +1 | −1 | −1 | +1 | −1 | +1 |
| 1 1 0 0 1 1 0 0 | −1 | −1 | +1 | +1 | −1 | −1 | +1 | +1 | +1 | −1 | −1 | +1 | +1 | −1 | −1 | +1 |
| 1 1 0 0 0 0 1 1 | −1 | −1 | +1 | +1 | +1 | +1 | −1 | −1 | +1 | −1 | −1 | +1 | −1 | +1 | +1 | −1 |
| 1 0 1 0 1 0 1 0 | −1 | +1 | −1 | +1 | −1 | +1 | −1 | +1 | −1 | −1 | −1 | −1 | −1 | −1 | −1 | −1 |
| 1 0 1 0 0 1 0 1 | −1 | +1 | −1 | +1 | +1 | −1 | +1 | −1 | −1 | −1 | −1 | −1 | +1 | +1 | +1 | +1 |
| 1 0 0 1 1 0 0 1 | −1 | +1 | +1 | −1 | −1 | +1 | +1 | −1 | −1 | −1 | +1 | +1 | −1 | −1 | +1 | +1 |
| 1 0 0 1 0 1 1 0 | −1 | +1 | +1 | −1 | +1 | −1 | −1 | +1 | −1 | −1 | +1 | +1 | +1 | +1 | −1 | −1 |

Finally, the angle of the sum vector is determined by a rectangular-to-polar conversion module 607, and provided as the feedback phase error term $\theta_e$:

$$\theta_e = \tan^{-1} \frac{\tilde{Q}}{\tilde{I}}$$

As proposed, the phase detector of FIG. 7 is more efficient than the phase detector shown in FIG. 6. The key realization in supporting this claim is that $\tilde{I}$ and $\tilde{Q}$ are already computed internally by the block decoder 603. The coefficients used in the computation of $\tilde{Q}$ are exactly the same ones used in the computation of $\tilde{I}$ corresponding to a different codeword decision, i.e. rows of the third column are the permuted rows of the second column in the above coefficient table. The terms $\tilde{I}$ and $\tilde{Q}$ in fact correspond to 2 of the 16 correlation values computed in parallel by the decoder. The determination of which correlation values to pass on as $\tilde{I}$ and $\tilde{Q}$ is based on the codeword decision or equivalently the decoded 4-bit pattern. The enhanced block decoder 703 of FIG. 7 shows that by adding very simple selection circuitry, $\tilde{I}$ and $\tilde{Q}$ can be obtained directly. For example, if the decided codeword was "00000000", then according to the above coefficient table, the selection circuitry would select the correlation values associated with the codewords "00000000" and "10101010" as the $\tilde{I}$ and $\tilde{Q}$ terms respectively. By utilizing the otherwise discarded correlation values computed inside the decoder 703, much of the hardware complexities of FIG. 6 is taken away. In the implementation shown in FIG. 7, direct computation of $\tilde{I}$ and $\tilde{Q}$, are not required; therefore, the modules associated with the block encoder and phase modulator 604, the second complex rotator 605 and the summer 606 are not required. The selection circuits can be simple multiplexers and the map circuit in block decoder 703 follows directly from the permutation rule suggested by the coefficient table provided above.

The Reed-Muller Decoder and the phase error generation circuit are shown as separate functional blocks in FIGS. 4 and 5 merely to emphasize this implementation visually; they are not separate pieces of hardware or processes and the phase error generation does not "follow" the Reed-Muller decoding.

In the circuitry of FIGS. 4 and 5, after Reed-Muller decoding, the effects of the data are again removed. However, use is made of correlation values already available from the decoding process itself to compute the phase error (or at least the heavy phase error). This is possible because during the correlation process (i.e., during Reed-Muller decoding), the hard decisions on the received data are correlated with the possible codewords and the one that matches best (has the highest correlation) is accepted as the decoded codeword. The correlation values that correspond to producing the winning codeword can be used again to remove the rotational effects on the phase error due to the data. Furthermore, this processing can be done in parallel to speed up the estimate for phase error.

The phase error generation, although shown as a unique functional block receiving the input and output of the Reed-Muller decoder, performs a derotation by retaining and using all of the bits of the most likely codeword as determined by the processing executed in the Reed-Muller decoder. By using the information already developed in the Reed-Muller decoder when estimating the phase error, the implementation in FIG. 7 provides the advantage that it is possible to reduce the number of gates necessary in the hardware to implement the phase locked loop. Furthermore, during the basic Reed-Muller decoding, the multiplication products can be computed in parallel and then combined. This provides the advantage that it is possible to reduce latency.

To provide a fair comparison of the demodulator described herein with a conventional demodulator, the PLL loop preferably has a wider noise bandwidth than the basic DD-PLL loop to account for the fact that it operates with a longer epoch. With the biorthogonal code example which updates every four symbols versus the use of every symbol for the basic DD-PPL loop, a first order tracking loop should have a gain constant that is four times larger so that the loop's tracking error resulting from a frequency difference between the transmitter and the receiver is the same as for the basic DD-PLL loop. Nevertheless, the overall loop performance is better with the PLL loop of the present invention because of the much lower error rate for the (8,4) biorthogonal code decisions, as compared to the symbol by symbol decisions of the basic DD-PLL loop.

In a conventional demodulator, the demodulation process starts with a single phase and frequency estimate. The initial phase and frequency estimates may or may not be accurate depending on the signal-to-noise ratio of the input modulated signal. At low signal-to-noise ratios, there will be a percentage of phase and frequency estimates which will result in high bit error rates at the beginning of demodulation of the data portion or which will result in dropped cells or acquisition failures.

Figure 9:
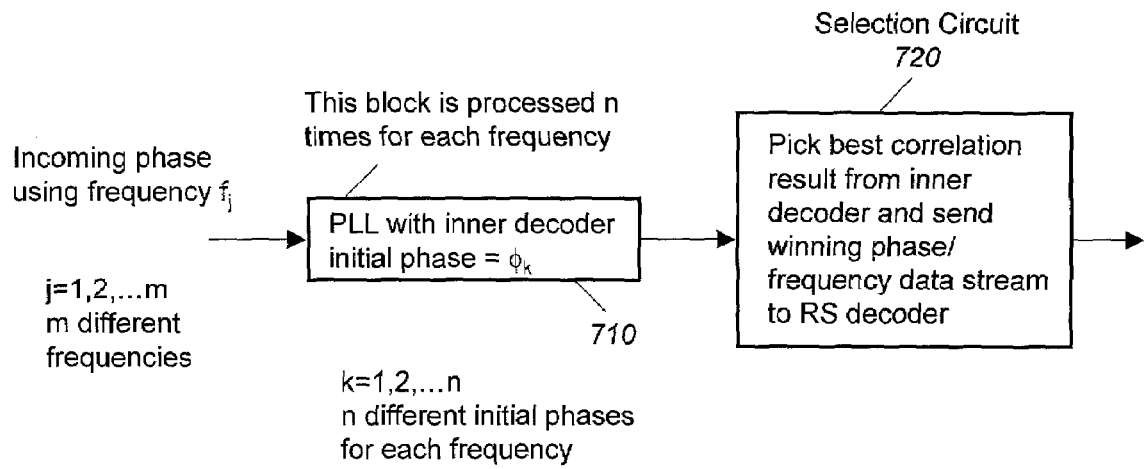
FIG. 9 is a block diagram of an example demodulator of the invention in which an input modulated signal is processed multiple times in a phase locked loop according to multiple initial phase/frequency estimates.
Figure 10:
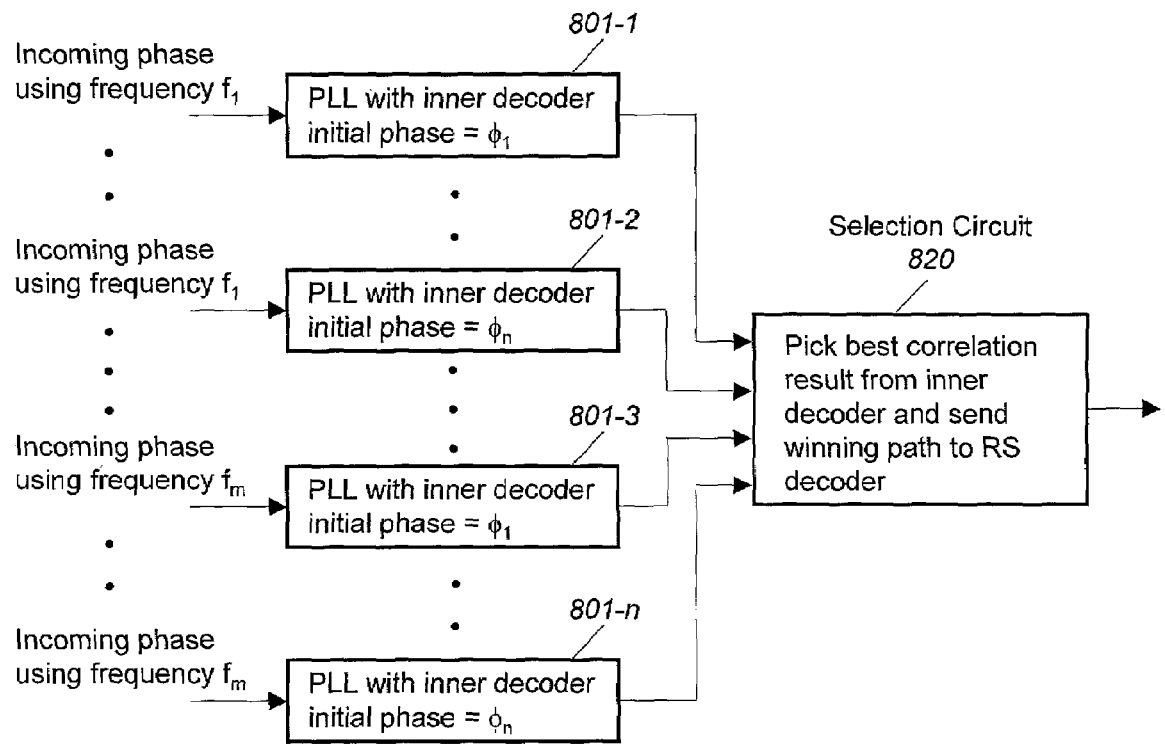
FIG. 10 is a block diagram of an example demodulator of the invention in which an input modulated signal is processed in a plurality of phase locked loops having respectively different initial phase/frequency estimates.
Figure 11:
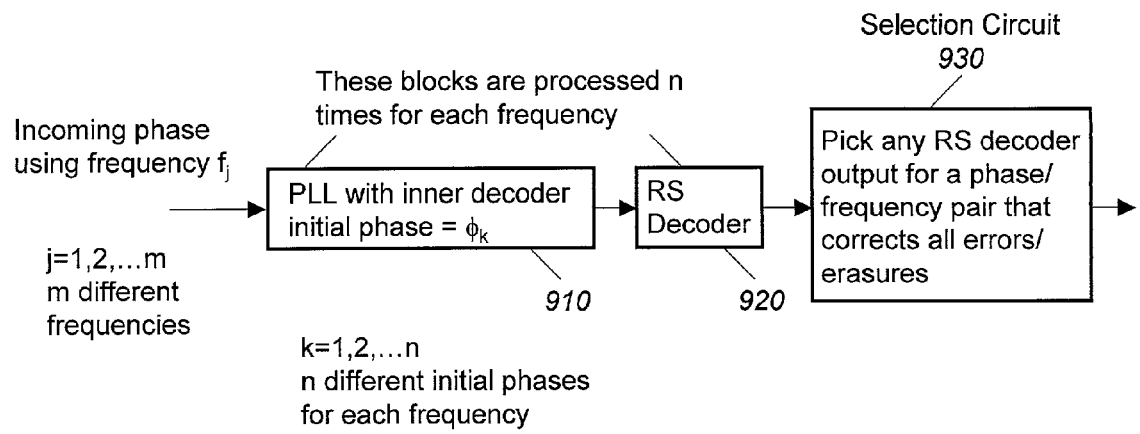
FIG. 11 is a block diagram of an example demodulator of the invention in which an input modulated signal is processed multiple times in a phase locked loop having an inner block decoder and in a outer block decoder according to multiple initial phase/frequency estimates.

Therefore, in preferred embodiments of the invention shown in FIGS. 9-11, there are multiple demodulation processes, each with a unique initial phase and frequency estimate. At least one of the demodulation processes starts with an initial phase and frequency error close to 0. This demodulation process would likely have the best chance for success. Nevertheless, a range of initial phase estimates and frequency estimates, and the resolution between different discrete initial phase estimates and frequency estimates within the range, would be processed depending on the expected error profile. For example, there may be 3 or 4 or more initial phase estimates. In the case of three initial phase estimates, they could have a resolution of 15 degrees and be located at 0 degrees, +15 degrees, and −15 degrees with respect to the initial phase estimate.

Depending on the criteria, one of the demodulation processes could be selected after N symbols, at the end of each whole burst, or at the end of each part of a burst. At that point, one of the demodulation processes is selected by either measuring the cumulative correlation metrics from the inner block decoder in the phase locked loop(s) or by relying on successful Reed-Solomon decoding. The multiple estimates provides a range of unique input conditions where at least one set of the initial conditions is likely to be close to the actual input conditions of the input modulated signals. The preferred embodiments thus reduce the codeword error rate and initial phase estimate error at the beginning of the data portion due to poor phase estimates by processing with multiple initial phase/frequency estimates.

Figure 12:
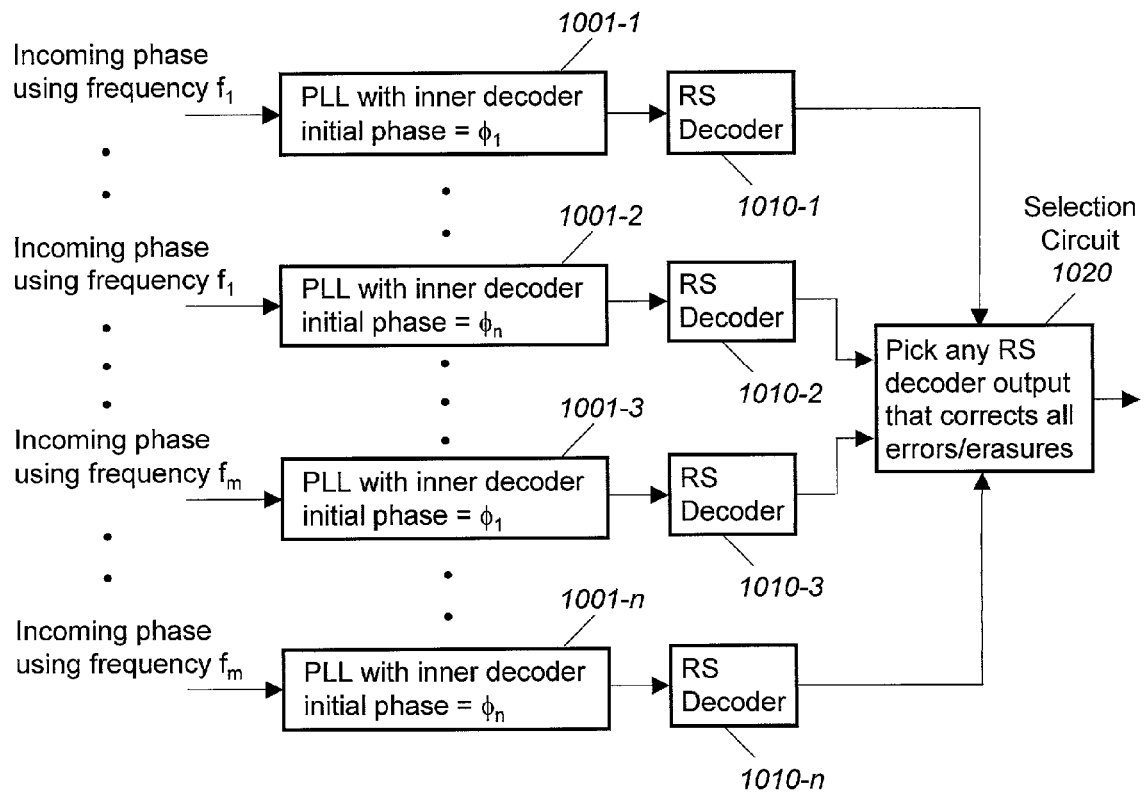
FIG. 12 is a block diagram of an example demodulator of the invention in which an input modulated signal is processed in a plurality of phase locked loops having inner block decoders and corresponding outer block decoders, each phase locked loop having respectively different initial phase/frequency estimates.

The principles of the invention may be implemented in different ways. The data may be processed in parallel as shown in FIGS. 10 and 12, or stored and processed serially as shown in FIGS. 9 and 11. In the implementation of FIG. 9, a single PLL with inner block decoder 710 receives the input modulated signal at successive different frequencies. It first processes the signal for a first frequency using multiple phase estimates. The signal is processed at the first frequency for a number of times equal to the number of phase estimates. PLL 710 then processes the input modulated signal for a second frequency using the same multiple phase estimates. The signal is processed at the second frequency for the same number of times as the first frequency. This is repeated until the signal is processed for all combinations of the frequencies and phase estimates. The signal is stored temporarily to allow multiple serial processings. For example, if there are two different frequencies and four different initial phase estimates, then there will be eight (2×4) different output results from PLL 710. Selection Circuit 720 receives all of the outputs in sequence and selects the output having the best correlation metric to be passed onto an outer block decoder, such as a Reed-Solomon block decoder (not shown in FIG. 9).

In the implementation of FIG. 10, there are multiple PLLs 801-1 to 801-n, each with a respective inner block decoder. Each PLL receives the input signal using a single frequency and a single initial phase estimate. In this implementation, the number of PLLs is equal to the number of possible combinations of frequency and initial phase estimates. Each PLL has a unique combination of frequency and initial phase estimate. Selection circuit 820 receives the outputs of each one of PLLs 801-1 to 801-n and selects the output having the best correlation metric to be passed onto an outer block decoder, such as a Reed-Solomon block decoder (not shown in FIG. 10).

In the implementation of FIG. 11, the input signal is serially processed with multiple initial phase/frequency estimates in a single PLL 910 as described with reference to FIG. 9. However, the outputs from PLL 910 are provided directly to a Reed-Solomon block decoder 920 for decoding of codeword errors. Selection circuit 930 receives the serial outputs from Reed-Solomon block decoder 920 and selects the output for the initial phase/frequency estimate which corrects all of the errors/erasures in the codewords. In the implementation of FIG. 12, the input signal is processed in parallel in multiple PLLs 1001-1 to 1001-n as described above with reference to FIG. 11. However, the outputs from PLLs 1001-1 to 1001-n are provided directly to respective Reed-Solomon block decoders 1010-1 to 1010-n for decoding of codeword errors. Selection circuit 1020 receives the outputs from all of the Reed-Solomon block decoders 1010-1 to 1010-n, and selects the output for the initial phase/frequency estimate which corrects all of the errors/erasures in the codewords. If none of the outputs are correct, then the data can be discarded as usual.

Furthermore, the preferred embodiments may be utilized in such a way as to selectively provide excess processing power to identified bursts in the input signal so that a higher cell loss ratio can be achieved. In other words, the process of processing a burst with multiple initial phase/frequency estimates can be applied only to bursts which are identified as being likely to fail or which actually does fail based on the decoding of the outer Reed-Solomon block decoder. Of course, other methods of applying excess processing power besides multiple processing with different phase/frequency estimates may be utilized, such as selective error/erasure correction by a outer block decoder.

Preferably, the bursts of the input signal are processed in parallel by a single sub-channel processor. One of the parallel bursts is identified and the excess processing power is applied to that selected burst, thereby reducing the likelihood that the burst would be dropped. Thus, instead of providing a demodulator with excess processing power to each sub-channel, only a single such demodulator needs to be provided. As a result much lower cell loss ratios could be achieved by selectively adding excess processing power. While a hardware implementation is shown in FIGS. 9–12, this technique could also be applied to software based demodulators as well as a modification of such a hardware implementation.

As described, the demodulator according to the invention uses a block decoder for short block codes, including an (8, 4) biorthogonal code, within a phase locked loop to advantageously provide better phase tracking of either a binary phase shift keying (BPSK) modulated signal or a quaternary phase shift keying (QPSK) modulated signal using codeword level decisions rather than symbol by symbol decisions. Loop corrections are performed at decode rate, not symbol rate.

While there have been illustrated and described what are considered to be preferred embodiments of the present invention, it will be understood by those skilled in the art that various changes and modifications may be made, and equivalents may be substituted for elements thereof without departing from the true scope of the present invention. For example, any (n, k) block code may be used in lieu of the (8, 4) biorthogonal code described herein as the preferred embodiment. Examples of these block codes may include the Extended Hamming (12,8) code and the Nordstrom-Robinson (16,8) code. Similarly, other modulation formats may be used in lieu of the binary phase shift keying (BPSK) or the quaternary phase shift keying (QPSK) modulation as described as the preferred embodiment of the present invention. Examples of other modulation formats may include octonary phase shift keying (OPSK). Larger block codes such as the Extended Golay (24,12) code (described in Golay, M. J. E., "Notes on Digital Computing," Proc. IRE, 37, Correspondence, 657, 1949) using octonary phase shift keying (OPSK), Extended BCH (32,16) code (described in Bose, R. C., and D. K. Ray-Chaudhuri, "On a Class of Error Correcting Binary Group Codes," Info. and Control, 3, 68–79, 1960; Bose, R. C., and D. K. Ray-Chaudhuri, "Further Results on Error Correcting Binary Group Codes," Info. and Control, 3, 279–290,1960; and Hocquenghem, A., "Codes Correcteurs D'erreurs," Chiffres (Paris), 2, 147–156, 1959) and Extended Quadratic Residue (48,24) code (described in Prange, E., Some Simple Error-Correcting Codes with Simple Decoding Algorithms, AFCRC-TN-58-156, Air Force Cambridge Research Center, Bedford, Mass., April 1958) may also be utilized for improved demodulation performance. If the (24, 12) extend Golay code using octonary phase shift keying (OPSK) may be used where each symbol may correspond to three chips with eight symbols corresponding to a codeword, the derotation step for OPSK may be more complex than the simple swap and complement procedure described for QPSK. However, the fundamental concept of using a block decoder within the phase locked loop may be identical. Further, many modifications may be made to adapt a particular situation to the teachings of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The invention claimed is:

1. A decision directed phase locked loop circuit, comprising:
   a phase detector which receives an input sequence of baseband complex samples in a burst data communication system and current phase estimates and generates phase differences between said baseband complex samples and current phase estimates;
   an inner block decoder which decodes said baseband complex samples to generate decoded data;
   a phase error generation circuit which receives said baseband complex samples and said decoded data from said inner block decoder and which generates feedback phase error terms based on said baseband complex samples and said partially decoded data, wherein said inner block decoder and phase error generation circuit are adapted to selectively apply excess processing power to a burst in said burst data communication system;
   a selection circuit which identifies a burst to be demodulated with excess processing power, said selection circuit providing said identified burst to said inner block decoder and said phase error generation circuit so as to selectively apply excess processing power in order to re-process said burst;
   an outer block decoder which receives the associated codewords generated by said inner block decoder and which utilizes and corrects only codewords associated with baseband complex samples after the group of baseband complex samples consisting of the first baseband complex samples received by said phase detector;
   a loop filter which filters said phase error terms; and a phase accumulator that updates the current phase estimate on each iteration of the phase locked loop.

2. A decision directed phase locked loop as claimed in claim 1, wherein the baseband complex samples are demodulated from an input modulated signal corresponding to one of a binary phase shift keying (BPSK) modulated signal and a quaternary phase shift keying (QPSK) modulated signal and encoded by a sequence of codewords.

3. A decision directed phase locked loop as claimed in claim 2, wherein said codewords correspond to biorthogonal binary codes.

4. A decision directed phase locked loop as claimed in claim 3, wherein each of said codewords contains four data symbols, and the decode rate for decoding a set of vector pairs of phase stabilized observables corresponds to one quarter of a symbol rate.

5. A decision directed phase locked loop as claimed in claim 4, wherein said inner block decoder comprises a Reed-Muller block decoder.

6. A decision directed phase locked loop as claimed in claim 5, wherein said phase error generation circuit generates said feedback phase error terms based on the composite decoded codeword phase error relative to reference.

7. A decision directed phase locked loop as claimed in claim 6, wherein said current phase estimate is updated at one quarter the symbol rate.

8. A decision directed phase locked loop as claimed in claim 6, wherein said current phase estimate is updated every codeword of four data symbols.

9. A decision directed phase locked loop as claimed in claim 1, wherein said phase detector includes a subtractor for subtracting the incoming phase of said baseband complex samples from the current phase estimate to generate said phase differences.

10. A demodulator for demodulating an input modulated signal in a burst data communications system, comprising:
a plurality of phase locked loops, each having a first block decoder configured to decode bursts of the input modulated signal at a decode rate to generate a set of associated codewords and a phase/frequency error estimate and a second block decoder which receives the phase/frequency as an, wherein one of said plurality of phase locked loops is adapted to selectively apply excess processing power to a burst of said input modulated signal; and
a selection circuit which identifies a burst of said input modulated signal to be demodulated with excess processing power, said selection circuit providing said identified burst to said one of said plurality of phase locked loops which is adapted to selectively apply excess processing power based on a likelihood of phase estimation failure based on the output of the second block decoder of each of said plurality of phase locked loops, in order to re-process said burst of said input modulated signal.

11. A demodulator as claimed in claim 10, wherein said first block decoders in said plurality of phase locked loops also generate reliability metric results.

12. A demodulator as claimed in claim 11, wherein said reliability metric results comprise correlation results taken during decoding by said first block decoders.

13. A decoder as claimed in claim 11, wherein a second block decoder selects codewords from said set of associated codewords based on the reliability metric results from said first block decoders.

14. A demodulator as recited in claim 10, wherein said selection circuit identifies said burst based on the reliability metric results from said first block decoders.

15. A demodulator as claimed in claim 14, wherein said demodulator further comprises a second outer block decoder which receives the codewords output from the first block decoders and selectively corrects errors in the codewords and the selection circuit identifies said burst based on the decoding of the second outer block decoder.

16. A demodulator as claimed in claim 15, wherein said second block decoder preselects the codewords from among said set of associated codewords.

17. A demodulator as claimed in claim 16, wherein said preselected codewords comprises the first codewords of the set of associated codewords.

18. The demodulator of claim 10, wherein the first block decoder of said one of said plurality of phase locked loops is configured to decode a set of vector pairs of the burst of said input modulated signal at a decode rate to generate the set of associated codewords and the phase/frequency error estimate.

19. The demodulator of claim 10, further comprising a second block decoder that receives the phase/frequency estimates from the plurality of phase locked loops, and wherein the selection circuit identifies the burst of the input modulated signal to be demodulated with excess processing power based on the decoding operation of the second block decoder, such that the burst of the input modulated signal to be demodulated with excess processing power is re-processed by said one of said plurality of phase locked loops.

20. The demodulator of claim 10, wherein each of said plurality of phase locked loops is configured to calculate a phase estimate of the bursts of the input modulated signal using a unique combination of initial frequency and phase estimates.

21. The demodulator of claim 20, wherein a quantity of said plurality of phase locked loops is equal to a quantity of possible unique combinations of frequency and initial phase estimates.

22. The demodulator of claim 10, wherein each of said plurality of phase locked loops are configured to process the bursts of the input modulated signal serially.

23. A communication receiver using a demodulator demodulating an input modulated signal from a transmission channel which is encoded by a sequence of codewords, comprising:
a plurality of phase locked loops which provide respective estimates of the phase of a burst of said input modulated signal, one of said phase locked loops receiving a burst of the input modulated signal and calculating a phase estimate using a different combination of frequency and initial phase estimate and comprising a first block decoder which decodes the set of vector pairs of the burst of said input modulated signal at a decode rate to generate a set of associated codewords and a phase/frequency error estimate; and
a second block decoder which receives the phase/frequency estimates from said plurality of phase locked loops, wherein one of the bursts is selected based on the decoding of the second block decoder and provided to said one of said plurality of phase locked loops to be re-processed with excess processing power.

24. A communication receiver as claimed in claim 23, wherein said input modulated signal comprises a phase shift keying modulated signal.

25. A communication receiver as claimed in claim 24, wherein said down converter down converts said input modulated signal into an intermediate frequency signal, and wherein said communication receiver further comprises:
- a synchronous demodulator which demodulates said intermediate frequency signal from a baseband quadrature pair into a sequence of complex sample pairs; and
- a matched filter and sampler which passes said sequence of complex sample pairs and samples at a symbol rate to produce said succession of baseband signal samples.

26. A communication receiver as claimed in claim 23, wherein said first block decoder in each phase locked loop also generates reliability metric results.

27. A communication receiver as claimed in claim 26, wherein said reliability metric results comprise correlation results taken during decoding by said first block decoders.

28. A communication receiver as claimed in claim 26, wherein said second block decoder dynamically selects codewords from said set of associated codewords based on the reliability metric results from the corresponding first block decoder.

29. A communication receiver as claimed in claim 23, wherein said first block decoders are Reed-Muller block decoders.

30. A communication receiver as claimed in claim 29, wherein said block decoders determine the phase error estimate based on the composite decoded codeword phase error relative to reference.

31. A communication receiver as claimed in claim 30, wherein said second block decoder preselects the codewords from among said set of associated codewords.

32. A communication receiver as claimed in claim 31, wherein said preselected codewords comprise the first codewords of the set of associated codewords.

* * * * *